United States Patent [19] [11] Patent Number: 4,835,720
Ditto et al. [45] Date of Patent: May 30, 1989

[54] OBSTRUCTED-FIELD-INDICIA-SENSING DEVICE

[75] Inventors: James W. Ditto, Golden; James W. Jensen, Jr., Boulder, both of Colo.

[73] Assignee: Adolph Coors Company, Golden, Colo.

[21] Appl. No.: 838,383

[22] Filed: Mar. 11, 1986

[51] Int. Cl.⁴ .............................................. B65B 41/18
[52] U.S. Cl. ...................................... 364/561; 382/34; 156/64; 156/361; 156/495
[58] Field of Search ......................... 156/64, 361, 495; 364/470, 561, 562, 469; 382/34; 377/8, 18, 50; 340/675; 226/3, 4, 27, 28, 2; 101/219, 220

[56] References Cited

U.S. PATENT DOCUMENTS

| | | | |
|---|---|---|---|
| 3,439,176 | 4/1969 | Astley et al. | 250/561 |
| 3,783,293 | 1/1974 | Gold et al. | 250/548 |
| 4,066,015 | 1/1978 | Polko | 101/219 |
| 4,143,566 | 3/1979 | Laciak et al. | 226/2 |
| 4,170,883 | 10/1979 | Varner | 364/469 |
| 4,248,655 | 2/1981 | Kerwin | 156/361 |
| 4,254,173 | 3/1981 | Peer, Jr. | 428/204 |
| 4,364,502 | 12/1982 | Frentress | 226/3 |
| 4,366,372 | 12/1982 | Sargent | 377/8 |
| 4,482,972 | 11/1984 | Lewis et al. | 377/18 |
| 4,485,982 | 12/1984 | St. John et al. | 242/57.1 |
| 4,495,583 | 1/1985 | Punater | 377/18 |
| 4,496,417 | 1/1985 | Haake et al. | 156/361 |
| 4,542,893 | 9/1985 | Clause, Jr. et al. | 226/2 |
| 4,549,917 | 10/1985 | Jensen, Jr. | 156/514 |
| 4,572,752 | 2/1986 | Jensen et al. | 156/361 |
| 4,617,080 | 10/1986 | Kobayashi et al. | 226/27 |
| 4,644,584 | 2/1987 | Nagashima et al. | 382/34 |
| 4,717,059 | 1/1988 | Takahashi | 226/2 |
| 4,719,575 | 1/1988 | Gnuechtel | 364/469 |
| 4,737,904 | 4/1988 | Ominato | 226/28 |

FOREIGN PATENT DOCUMENTS

81112/75 5/1975 Australia .
1413857 10/1968 Fed. Rep. of Germany .
2053283 5/1972 Fed. Rep. of Germany .
2731914 1/1979 Fed. Rep. of Germany .

OTHER PUBLICATIONS

English translations of these references are also enclosed, This reference corresponds to French Patent Document No. 77 38907.

Primary Examiner—Parshotam S. Lall
Assistant Examiner—Ellis B. Ramirez
Attorney, Agent, or Firm—Klaas & Law

[57] ABSTRACT

An apparatus for monitoring the phasing relationship of a moving web of material of the type having a repeating series of graphics patterns thereon which repeat at ordinarily constant distance repeat length intervals of web travel and which contain separate repeating indicia portions which define a repeating indicia set which are positioned in a repeating indicia path extending longitudinally of the web comprising: an indicia detection device for providing an indicia detection pulse signal; a web travel sensing device for providing a web movement signal; an indicia profiling device for processing the indicia pulse signal and the web monitoring signal for generating a unique indicia image for each of the repeating indicia in a selected repeat length portion of the web; an indicia image storage device for identifying and storing the indicia images from a first selected repeat length portion of the web; a register indicia designation device for initially designating one of the repeating indicia to be register indicia; a register indicia sensing device for providing a register indicia pulse signal having pulses which in normal operation corresponds to the detection of the selected register indicia; a register indicia verification device for verifying that the repeating indicia which is in synchronization with said register indicia pulse signal is the currently designated register indicia; and a register indicia correction device for designating the indicia that is in synchronization with said register indicia pulse signal as the register indicia and replacing the previously designated register indicia therewith when the indicia image of the current register indicia is not verified to be the indicia which is in synchronization with the register indicia pulse signal.

22 Claims, 12 Drawing Sheets

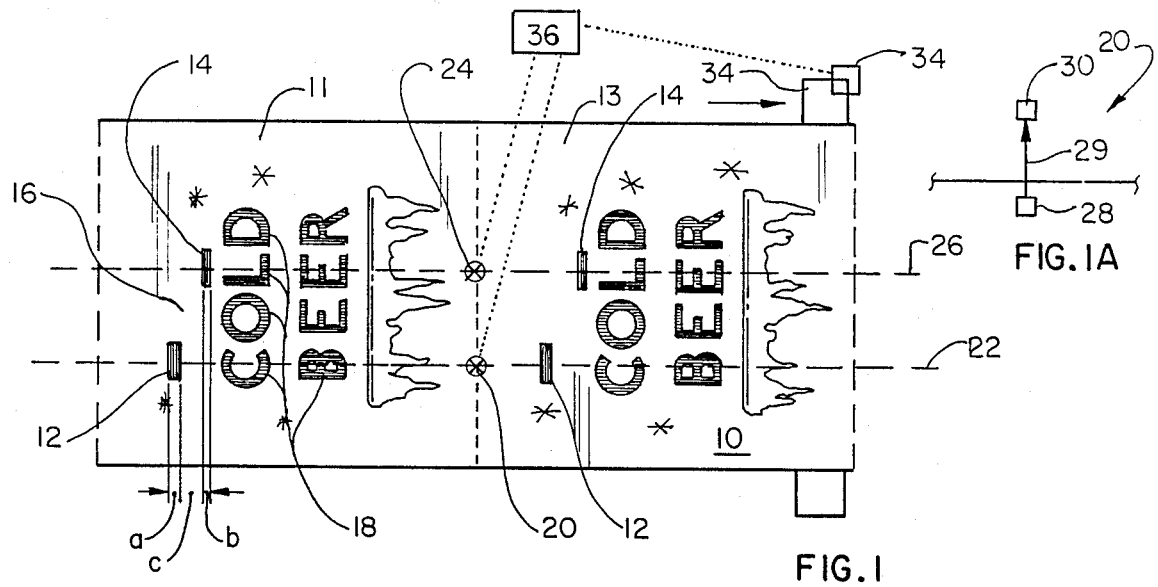
FIG.1
FIG.1A
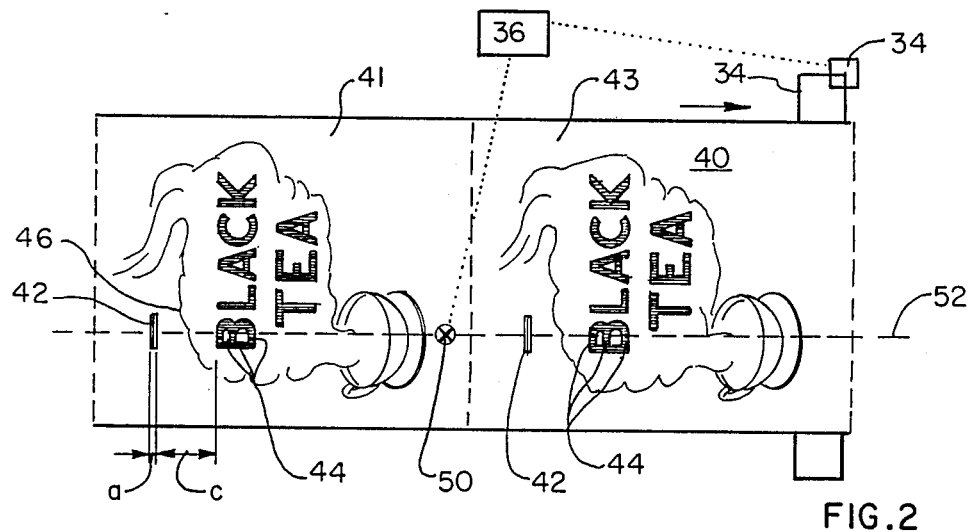
FIG.2
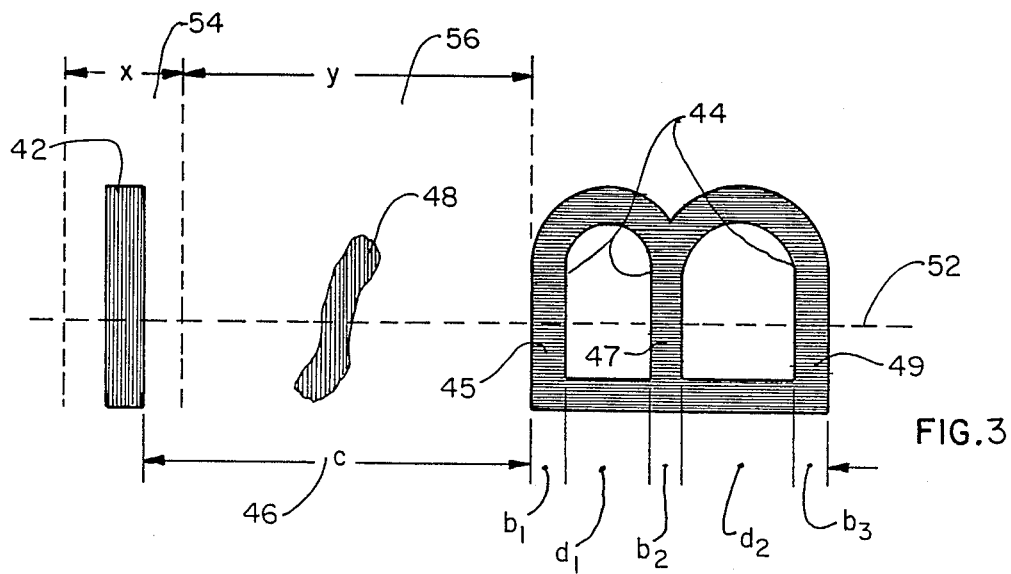
FIG.3

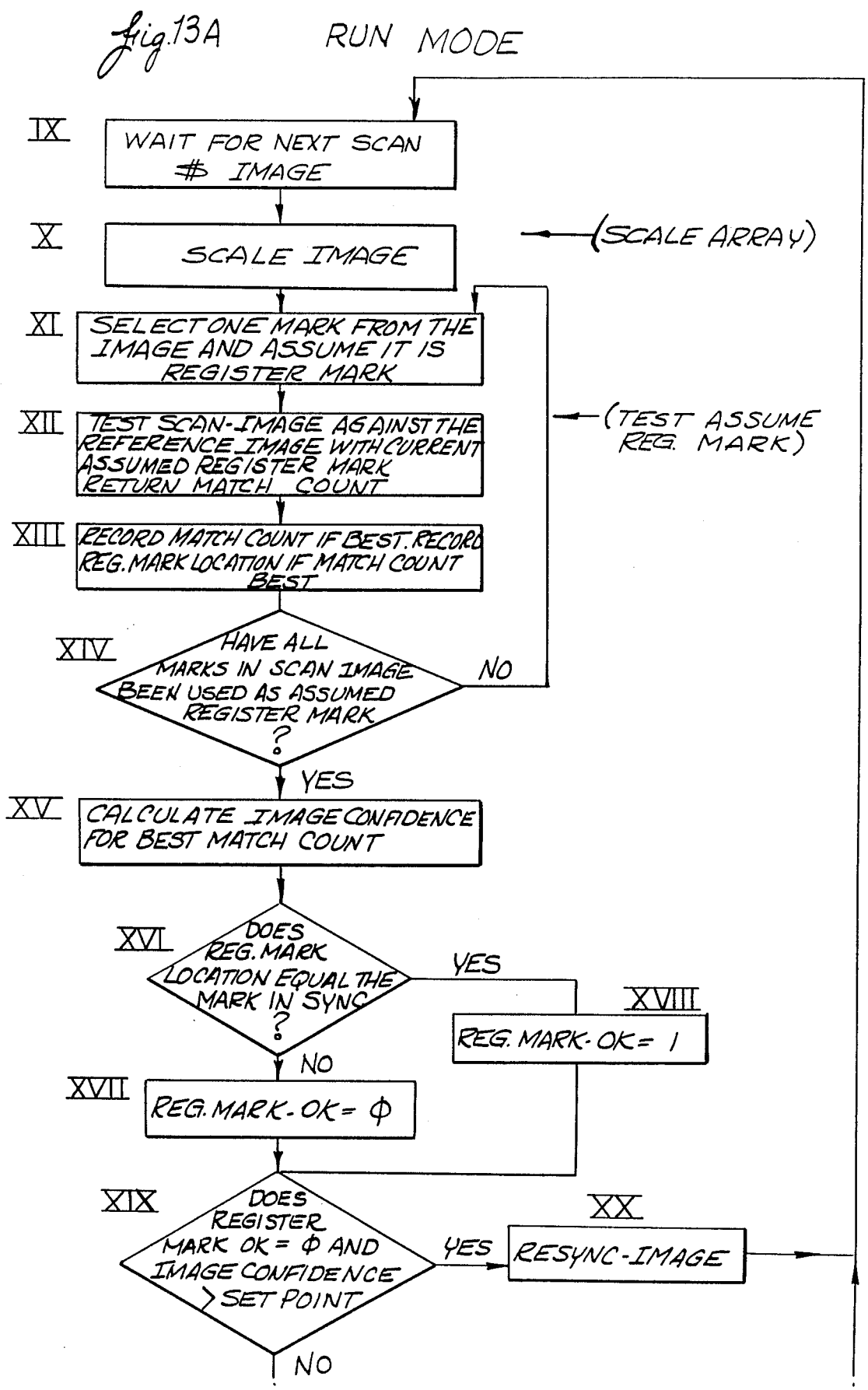

OBSTRUCTED-FIELD-INDICIA-SENSING DEVICE

BACKGROUND OF THE INVENTION

The present invention relates generally to indicia-sensing apparatus for sensing the relative position of preprinted indicia on a moving web of material and, more particularly, to an indicia-sensing device for detecting predetermined register indicia on a moving film web having an obstructing field of indicia positioned about the register indicia.

The use of composite material in packaging applications has met with a growing acceptance in the past few years because of high strength, low cost, and other characteristics which make it superior to conventional paper board or cardboard in many applications. A typical composite may have a thin layer of plastic film adhered to a relative thicker layer of paper board material. A method of producing such a composite material is described in U.S. Pat. No. 4,254,173 issued Mar. 3, 1981, for COMPOSITE MATERIAL FOR SECONDARY CONTAINER PACKAGING of A. Dean Peer, Jr., which is hereby incorporated for reference for all that it contains.

During high speed production of composite material such as the type described in the Peer patent, a continuously moving web of paper board material is adhered to a continuously moving web of plastic film material at a relatively high speed. During such high speed laminating operations, the relatively thin plastic web is subject to a number of conditions which may cause it to shrink or expand prior to lamination with the paper board web. Composite material used for packaging may have a repeating set of graphics printed on the plastic film web; and, thus, it is essential to control the stretch or relaxation in the plastic film web in order to provide a composite material having graphics of an exact, predetermined dimension. The method and apparatus for controlling the longitudinal dimension of each repeating set of graphics on a moving film web are described in U.S. patent application Ser. No. 441,276 filed Nov. 12, 1982, for CONTROL STRETCH LAMINATING DEVICE OF Haake, Fowler, and Jensen, now U.S. Pat. No. 4,496,417, which is hereby incorporated by reference for all that it contains.

As disclosed in the Haake et al. application, an essential part of a film-stretch-control apparatus is a monitoring device which monitors the passage of certain fixed indicia on the film web which are located at a predetermined position on each repeat length of the film web. The indicia in the Haake et al. application are sensed by high speed photoelectric devices; and a monitoring signal therefrom is processed by a high speed data processing device which also receives a signal indicating the film web velocity and, from these two bits of information, computes the distance between the predetermined indicia. This information is subsequently used to relatively stretch or shrink the film prior to lamination to the paper board in order to provide a composite material having graphics of a precise size and repeat length. The indicia printed on the film web described in Haake et al. move along a photoelectric scanner path which is otherwise free of indicia which would disturb the light beam of the photoelectric scanner, i.e., there are no other indicia positioned on the web as to intersect a straight line drawn between any pair of the length-indicating indicia on the film web.

In many applications wherein a set of graphics occupies the entire width of the film web, such an unobstructed path for the photoelectric sensors cannot be provided without adding an additional width of material which must be subsequently trimmed off the composite web at a significant increase in time and expense.

Thus, it would be desirable to provide a method and apparatus for detecting predetermined indicia within an obstructed field of indicia on a moving film web in order to monitor film web distortion or to provide other data relating to the moving film web. Such apparatus might be used in a similar fashion in any application wherein the recording or registering of predetermined indicia on a moving web is desired and wherein the predetermined indicia are positioned within an obstructing field of indicia.

SUMMARY OF THE INVENTION

The present invention includes an indicia detection apparatus for selectively detecting a predetermined register indicia on a moving web which is positioned within an encompassing field of indicia comprising code indicia having a predetermined pattern and having a spacially fixed relationship on said web relative to said register indicia; indicia sensing means for sensing the spacial configuration of indicia lying along a longitudinally extending, indicia sensing path comprising at least one longitudinally extending, narrow width sensing track and for generating a detection signal indicative of the spacial orientation of indicia in said longitudinally extending, indicia sensing path; data processing means for receiving said indicia detection signal and for comparing said signal with a predetermined set of criteria for detecting a portion of said detection signal corresponding to said code indicia and for selecting a portion of said detection signal for further processing based on the detection of said code indicia and the spacial relationship of said code indicia to said register indicia and for comparing said selected signal portion with a second set of criteria for detecting a portion of said selected signal portion corresponding to said register indicia and registering the detection of said register indicia.

The present invention also includes a method of detecting a predetermined register indicia pattern on a moving web which is positioned within an encompassing field of indicia, a portion of said encompassing field having a predetermined code indicia pattern positioned in predetermined spacial relationship to said register indicia pattern, comprising the steps of continuously monitoring a longitudinally extending code track on said web containing said predetermined code indicia pattern; comparing spacial relationships of indicia detected on said code track during monitoring with a predetermined model corresponding to said code indicia pattern until said code pattern is detected; selecting a short length portion of a longitudinally extending register track on said web containing said register indicia pattern, based upon the detection of said code indicia pattern; monitoring said selected portion of said longitudinally extending register path; comparing spacial indicia patterns detected on said register path with a predetermined model corresponding to said register indicia pattern until said register indicia pattern is detected.

The present invention also includes a method of detecting a predetermined register indicia pattern on a moving web positioned within an encompassing field of indicia, a portion of said encompassing field having a predetermined code indicia pattern, comprising the steps of continuously monitoring the passage of indicia within a longitudinally extending code path with a monitoring unit sensitive to all indicia in said code path, said code path including said code indicia pattern; comparing indicia patterns in said code path with a first set of predetermined criteria corresponding to said code indicia pattern for detecting the passage of said code indicia pattern; monitoring the passage of indicia within a longitudinally extending register path for a predetermined interval with a monitoring unit sensitive to all indicia in said register path, said register path including said register indicia pattern, said predetermined monitoring interval being initiated in response to detecting the passage of said code indicia pattern; comparing the indicia in said register path detected during said predetermined interval with a second predetermined set of criteria corresponding to said register indicia for detecting the passage of said register indicia; and recording the passage of said register indicia.

The present invention also includes a method of detecting a predetermined register indicia pattern on a moving web which is positioned within an encompassing field of indicia, a portion of said encompassing field having a predetermined code indicia pattern, comprising the steps of continuously comparing the indicia in a first longitudinally extending path with a first predetermined set of criteria corresponding to characteristics of said code indicia pattern and generating a first signal indicating the passage of each set of indicia meeting said first predetermined set of criteria; continuously comparing the indicia in a second longitudinally extending path with a second predetermined set of criteria corresponding to characteristics of said register indicia pattern and generating a second signal indicating the passage of each set of indicia meeting said second predetermined set of criteria; comparing said first signal with said second signal for detecting the occurrence of a code indicia pattern indication in said first signal and a register indicia pattern indication in said second signal within a predetermined interval; and registering the passage of a register indicia pattern whenever said comparison of signals indicates the occurrence of a register indicia pattern and a code indicia pattern within said predetermined interval.

BRIEF DESCRIPTION OF THE DRAWINGS

FIG. 1 is a plan view of an indicia detection apparatus being used to detect indicia on a moving film web.

FIG. 1a is an elevation view of a portion of FIG. 1.

FIG. 2 is another embodiment of an indicia detection apparatus.

FIG. 3 is a detail of a portion of the moving web shown in FIG. 2.

FIGS. 13A and 13B are flow diagrams of software decisions used in the run mode.

DETAILED DESCRIPTION OF THE INVENTION

Figure 4:
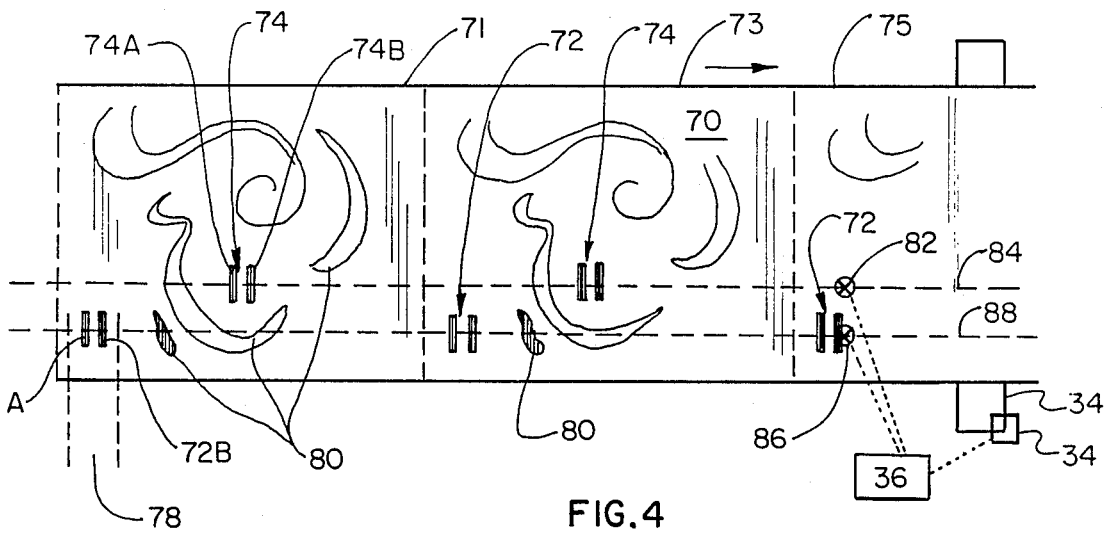
FIG. 4 is another embodiment of an indicia detection apparatus.

One preferred embodiment of the invention, which is presently the best mode contemplated, is illustrated in FIG. 1. A moving film web 10 having repeating sets of graphics provided on associated repeating length portions 11, 13 etc. of the web comprises a register indicia pattern positioned at the same relative location within each repeat length 11, 13 etc. In the embodiment illustrated in FIG. 1, the register indicia pattern comprises a single, transversely extending mark 12 having a dimension measured longitudinally of the web of a predetermined value "a" which may be, for example, one-eighth inch. Each repeat length also has a code indicia pattern positioned at the same relative location within each repeat length. In the embodiment of FIG. 1, the code indicia pattern comprises a single, transversely extending mark 14 having a predetermined, longitudinally measured dimension "b" which may be, for example, one-sixteenth inch. The register indicia pattern 12 and the code indicia pattern 14 within each repeat length are separated by a predetermined, longitudinally measured distance "c". The distance "c" may be, for example, one inch. Other indicia 18, such as, for example, display graphics, quality control graphics, and the like, may also be provided in repeating or random positions within each repeat length 11, 13, etc.

A first indicia sensing means, which in the embodiment of FIG. 1 comprises a register photoelectric sensor 20, is positioned at a fixed location relative to the moving film web whereat a relatively narrow width track 22 that is scanned by the photoelectric sensor 20 intersects a register indicia 12 on each succeeding repeat length 11, 13 etc. as the film web 10 progresses in the direction indicated (from left to right on the sheet of drawing). As illustrated in FIG. 1a, the register photoelectric sensor 20 may comprise a conventional photoelectric sensor including a light source 28 positioned below the moving film web 10 for directing a narrow beam of light 29 through the film web to a light sensor 30. The light sensor 30 generates a signal based upon the presence or absence of light from the light beam 29 which is periodically obstructed by the printed indicia on the film web 10. Thus, a time based signal is generated which, when compared with a film velocity based signal, may be used to determine the exact location and longitudinal dimesion of indicia passing through the light beam, i.e., indicia positioned along path 22. A film velocity based signal may be generated by a conventional encoder 32 or "rotor-pulsor" of the type described in the Haake et al. Patent Application Ser. No.

441,276 filed Nov. 12, 1982. The encoder 32 may be mounted to rollingly contact a roll 34 having a surface speed equal to that of the film web 10. Both the encoder 32 speed based signal and the time based signals from the photoelectric sensor 20, 24 are received and processed by a processing means such as a conventional microprocessor 36 of the type described in Haake et al. Patent Application Ser. No. 441,276 filed Nov. 12, 1982. It is an important feature of the present invention that indicia other than the register indicia 12 may be present along path 22 without affecting the accuracy or operation of the apparatus.

A second indicia sensing means in the embodiment of FIG. 1 comprises a code photoelectric sensor 24 which may be of identical construction to the register photoelectric sensor 20 and which senses all indicia positioned along a longitudinally extending, code sensing track 26 parallel to the register sensing track 22. Code photoelectric sensor 24 is positioned so as to intersect each code indicia pattern 14 on the moving film web. Thus, the two photoelectric sensors 20, 24 comprise an indicia sensing means for sensing the spacial characteristics of indicia lying within a longitudinally extending, indicia sensing path which, in turn, comprises the register sensing track 22 and the code sensing track 26.

Figure 5:
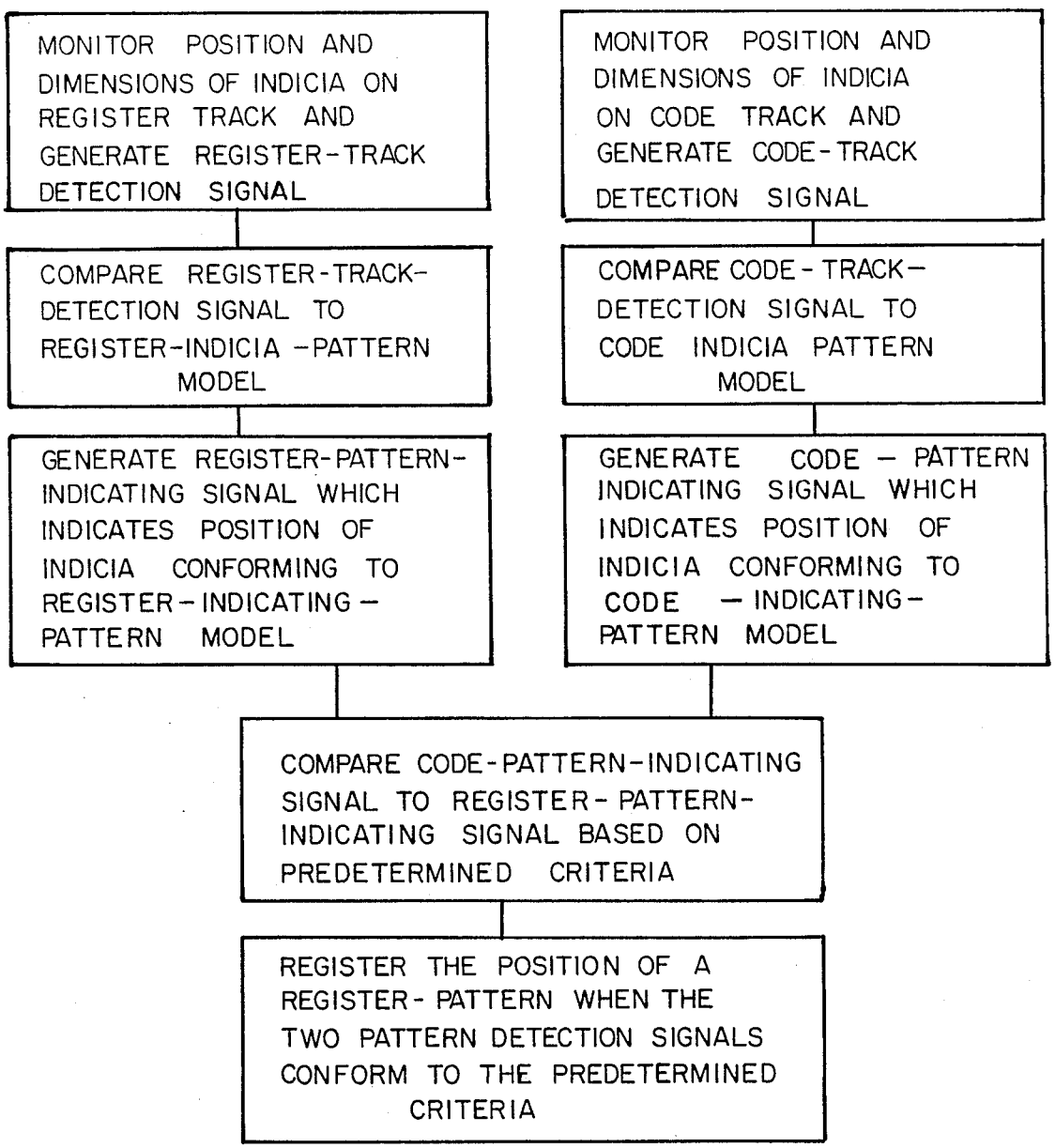
FIG. 5 is a flow chart of one method of operating a detection apparatus for detecting predetermined indicia in an obstructed field.

One method of utilizing the apparatus shown in FIG. 1 to cause exclusive registration of the passage of register indicia patterns such as mark 12 is illustrated in FIG. 5. Photoelectric 20 continuously monitors the passage of all indicia along code track 22 providing information regarding the longitudinal dimension of each set of indicia sensed and also the longitudinal spacing between the sensed indicia in a code-track-indicia-detection signal. Photoelectric sensor 24 simultaneously monitors the passage of all indicia along code track 26 and provides information regarding the longitudinal dimension and spacing of the indicia in a code-track-indicia-detection signal.

Next, each of the two indicia indicating signals is compared with a predetermined mathematical model. This model may consist, with respect to the register track detection signal, of the criteria that the indicia being examined must have a longitudinal dimension falling within a predetermined value range, e.g., the criteria may be that the indicia must have a dimension less than 1.1a and greater than 0.9a. With respect to the code-track-detection signal, the criteria may be that the indicia must have a dimension less than 1.1b and greater than 0.9b. By providing such tolerances mark irregularities which may be produced by variations in mark printing conditions will not effect the accuracy of the monitoring apparatus. A second set of signals is provided in response to each of these comparisons of the first set of signals with the respective mathematical models. The second set of signals generated indicates the relative position of indicia patterns conforming to the register indica model in the case of one signal and to the code indicia model on the case of the other signal. The second set of signals, i.e., the two pattern detection signals, is then compared. If a portion of the code-pattern-detection signal indicating the occurrence of a code pattern and a portion of the register-pattern-detection signal indicating the occurrence of a register pattern both occur within a predetermined time span, i.e., in physical terms, if the code mark 12 and the register mark 14 are detected within a predetermined distance of each other, the relative position of the detected-register-indicia pattern is recorded, i.e., registered for further processing.

Thus, it may be seen from the foregoing example that three sets of criteria must be satisfied before a mark detected by the photosensor 20 is recorded as a register indicia:

1. The mark must meet certain predetermined criteria regarding its longitudinal positioning. (In the preceding example, it must have a longitudinal dimension within 10 percent of the value of "a".)

2. The mark must be within a predetermined longitudinal distance from a detected code mark.

3. The code mark must have been found to meet certain predetermined characteristics. (In the preceding example, it must have a longitudinally measured dimension within 10 percent of the value "b".)

The probability of all three criteria being met simultaneously in a random occurrence is extremely low; and, thus, the statistical probability of the apparatus' recording only the proper register marks 12 is extremely high.

Referring now to FIG. 2, it may be seen that, in another embodiment of the invention, a film web 40 having repeat lengths 41, 43 etc. is provided with a register indicia pattern which may be a single mark 42 having a longitudinally measured dimension "a". The web is also provided with a code-indicia pattern 44 which, in the illustrations of FIGS. 2 and 3, comprises three bar portions 45, 47, 49 of the letter "B". The bars have longitudinally measured dimensions of $b_1$, $b_2$, $b_3$, respectively, and are separated by longitudinally measured distances of $d_1$, $d_2$, respectively. In this illustration, the register indicia pattern 42 and the code indicia pattern 44 are positioned so as to be intersected by a single, narrow-width-scanning track 52 of a photoelectric sensor 50 which may be of an identical construction to photosensor 20 described with reference to FIG. 1a. The code indicia pattern and the register indicia pattern are separated by a distance "c". A randomly positioned indicia 48 from the surrounding indicia field may lie along path 52 between the register indicia pattern 42 and the code indicia pattern 44. A register-indicia-pattern window 54 having a longitudinally measured dimension "x" is provided in a longitudinally bracketing relationship about the register indicia pattern 42 as will be described in further detail hereinafter. The register window 54 may begin at a distance "y" from the upstream edge of the code indicia pattern 44. The gap between patterns 42, 44 is here designated by the numeral 56.

Figure 6:
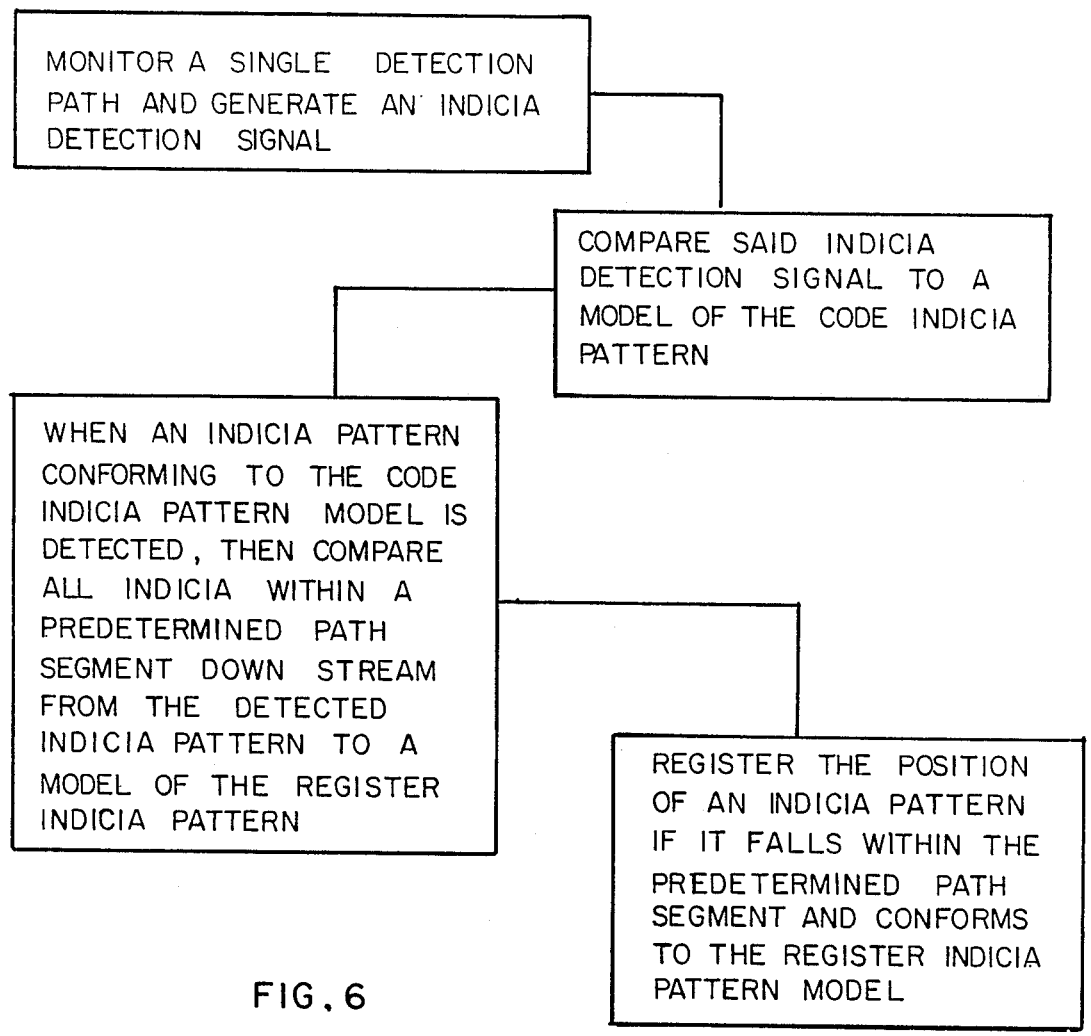
FIG. 6 is a flow chart of another method of operating a detection apparatus for detecting predetermined indicia in an obstructed field.

As illustrated by FIG. 6, the indicia monitoring apparatus of FIG. 2 operates by continuously monitoring a single detection path 52 and generating an indicia detection signal containing information as to the longitudinal dimension and longitudinal spacing of indicia detected by the photoelectric sensor 50.

Next, the indicia detection signal is compared with a mathematical model of the code indicia pattern 44. In this particular embodiment, the mathematical model consists of information including the longitudinal dimensions of each set of indicia sensed and also the distance between indicia sensed. Thus, for example, the mathematical model could require that the three indicia separated by distances equal to plus or minus 10 percent of $d_1$ with respect to the first distance and plus or minus $d_2$ with respect to the second distance be detected and, further, that the dimensions of the three indicia detected lie within the values $0.9b_1$ to $1.1b_1$, $0.9b_2$ to $1.1b_2$ and $0.9b_3$ to $1.1b_3$, respectively. After an indicia pattern conforming to the code-indicia-pattern model is detected, all indicia within a predetermined window 54 positioned a predetermined distance "y" downstream of the detected-code-indicia pattern are compared with a second mathematical model corresponding to the register indicia pattern. In this case, this may consist of the single criterion that the longitudinal dimension be within 10 percent of the value "a". If the indicia sensed within the window 54 conform to this value, they are then registered for further processing.

Figure 7:
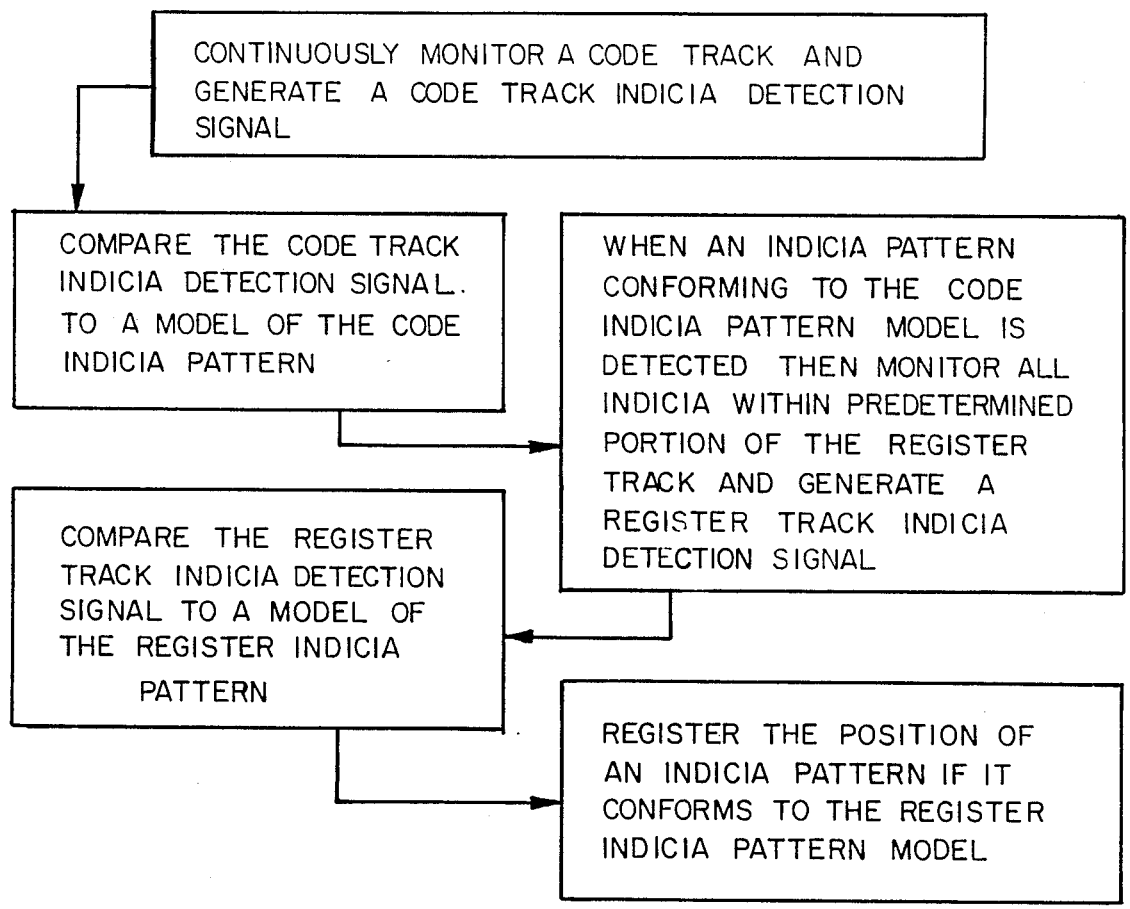
FIG. 7 is a flow chart of another method of operating a detection apparatus for detecting predetermined indicia in an obstructed field.

As illustrated by FIG. 4 in another embodiment of the invention, a moving film web 70 is provided with a series of register indicia patterns 72 at predetermined positions within repeat lengths 71, 73, 75, etc. Each register indicia pattern 72 has an associated code indicia pattern 74 positioned in longitudinally and transversely spaced-apart relationship from the register indicia pattern. The register indicia pattern 72 may comprise two marks 72A, 72B, each having a predetermined longitudinal dimension separated by a predetermined longitudinal distance. Each of the code indicia patterns may also comprise two marks 74A, 74B having predetermined longitudinal dimensions and spacing. The register indicia pattern 72 is separated from the code indicia pattern 74 longitudinally by a predetermined distance. A register indicia window 78, as described in further detail below, brackets the register indicia 72 and is positioned at a predetermined longitudinal distance from the code indicia pattern 74. Surrounding field indicia 80 may be positioned within the code sensing track 84 or register sensing track 89 defined by photoelectric code sensor 82 and photoelectric register 86, respectively. In this embodiment as illustrated in FIG. 7, the sequence of operations leading to registering of indicia pattern 72 may begin with continuously monitoring code track 84 and generating a code-track-indicia-detection signal. The code-track-indicia-detection signal is then compared with a model of the code indicia pattern based on criteria of, e.g., the dimensions of marks 74A, 74B, and the spacing therebetween. When a set of indicia is found to conform to this predetermined set of criteria, a command signal is generated to activate photosensor 86 at a predetermined longitudinal distance from the point of detection of the code indicia pattern. The photosensor 86 monitors only a small length predetermined portion of path 88 before it is switched off providing an indicia detecting signal. Indicia detected are compared with a second mathematical model with predetermined criteria based on the characteristics of the of the register indicia, e.g., number of marks, spacing between marks, mark dimensions. If the indicia detected by photoelectric sensor 86 conform to the mathematical model, then the position where this indicia pattern occurred is registered.

Figure 8:
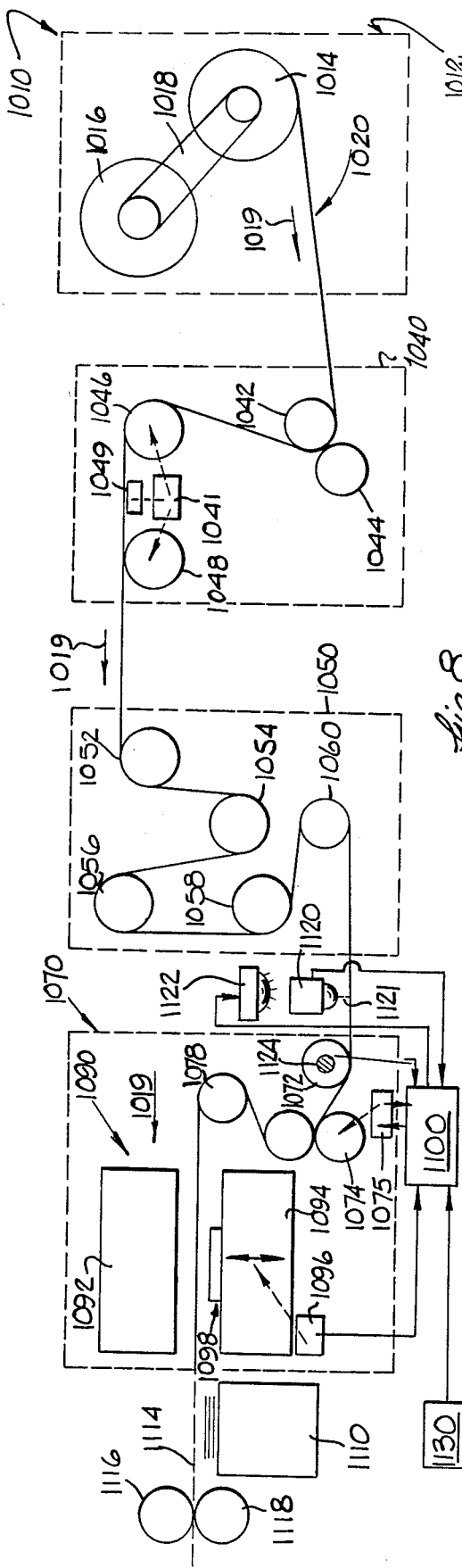
FIG. 8 is a schematic illustration of a continuous web and various operating stations used in processing thereof the which the control system of the present invention is utilized.

The Indicia Recognition System of the present invention may be used in a cutterline 1010 as illustrated in FIG. 8. The cutterline comprises a series of different areas for performing operations on a continuous web of material resulting in the cutting of predetermined portions of the continuous material web 1020 to form a plurality of individual cut blanks 1112.

Figure 9:
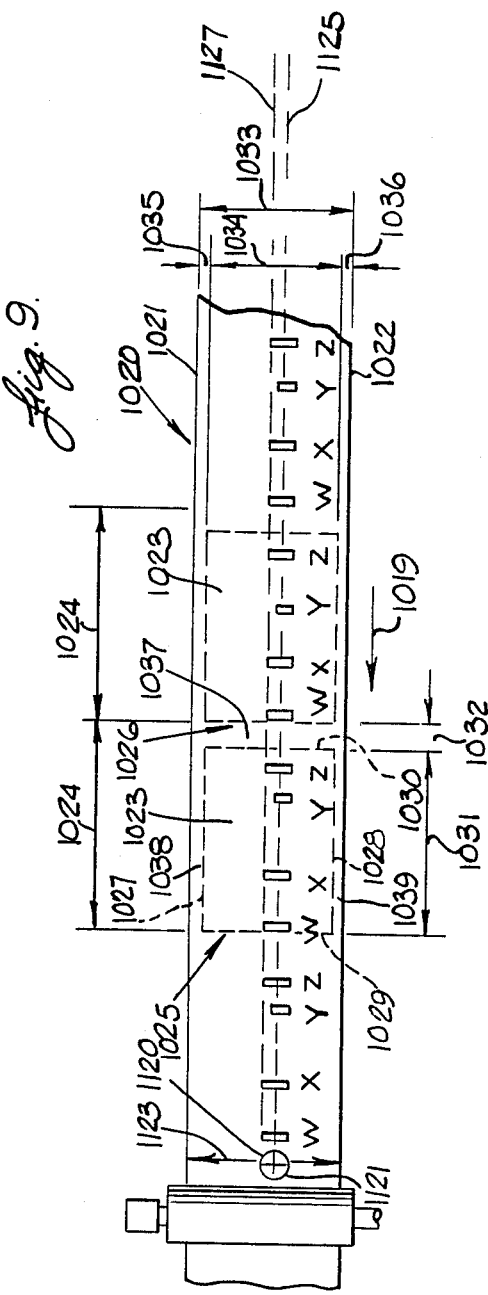
FIG. 9 is a top view of the web of FIG. 8.

The material web 1020 moves through the machine in a longitudinal direction 1019. As illustrated in FIG. 9, the web 1020 comprises a pair of parallel lateral edges 1021, 1022. A repeating pattern of graphics 1023 including repeating marks W, X, Y, Z are printed on the web 1020 and repeat at a predetermined substantial constant distance interval along the web hereinafter referred to as the "repeat length" 1024. Small variations in the repeat length may occur due to tension changes, etc. in the moving web. Within each repeat length 1024 is a design cutting location 1025, 1026, etc. The "design cutting location" refers to the location of the cut which the cutter 1098 will cut in the web if the system is operating correctly. The design cutting location thus has a preset relationship with respect to the graphics in any repeat length of web material. It will be appreciated that this design cutting location may vary from the actual cut made in repeat length if the web is not properly longitudinally phased and laterally aligned with the cutter. In the embodiment described the shape of the design cut is rectangular and comprises lateral edges 1027, 1028 positioned generally parallel the web lateral edges 1021, 1022 and also comprises a leading edge 1029 and a trailing edge 1030 positioned generally perpendicular the lateral edges of the web. Each repeat length 1024 comprises the longitudinal dimension 1031 of the design blank pattern i.e. the length of the pattern and also comprises the longitudinal dimension 1032 of the portion of the web 1037 positioned between the design cuts 1025, 1026 which may become scrap subsequent to the cutting of the web (depending on the shape of carton). The lateral dimension or width of the web 1033 comprises the lateral dimension 1034 of the blank cutting pattern and the lateral dimension 1035, 1036 of the portion of the web 1038, 1039 positioned outwardly of the design cut which will also become a portion of the scrap after the web is cut.

The first station of the cutterline 1010 is an unwind stand 1012 at which an unwind roll 1014 and a reserve roll 1016 are mounted on a conventional yolk 1018. Each of the rolls 1014, 1016 comprises a wound continuous web of material such as paper, plastic film, paper-film composite, or the like. A typical roll of material may have a width of 44 inches and a maximum diameter of 80 inches and may weigh on the order of 2½ tons. The material web 1012 is pulled from the unwind roll 1014 until the roll is exhausted. The trailing edge of the web from roll 1014 is then spliced to the leading edge of material on the reserve roll 1016 at which point the reserve roll becomes the unwind roll and another roll is mounted on the yolk 1018 in place of roll 1014. Such unwind and splicing operations are conventional and well-known in the art. The continuous web 1012 is drawn from the unwind roll 1014 by a pair of pinch rolls 1042, 1044 located in a decurl unit 1040 which may also be used in the web splicing operation. Subsequent to passing through the pinch rolls 1042, 1044 the web 1012 passes over decurl rolls 1046, 1048 which take out some of the curl which sets into a roll of material over the period in which it is in storage. The decurl rolls may also be used for lateral alignment of the moving film web 1020. The rolls 1046, 1048 are mounted on a frame which may be tilted from side to side to shift the web laterally as it crosses the rolls to maintain the web in a proper lateral position. A web edge sensor assembly 1049 is used to determine the lateral position of an edge portion of the film web and, based upon this determination, provides a signal to a hydraulic drive unit 1041 which tilts the frame supporting rollers 1046, 1048 in response to the signal to maintain the web 1020 in a laterally centered location in decurl unit 1040. Subsequent to passing through the decurl unit 1040 the web may pass into a string insertion unit 1050 in which strings may be glued onto the web to increase web strength. The actual assembly for string insertion may be of the type illustrated in U.S. Pat. No. 4,496,417 of Haake et al. which is hereby incorporated by reference. The web passes over a series of rolls 1052, 1054, 1056, 1058, 1060 in the string insertion unit. After leaving the string insertion unit 1050 the web 1020 passes into a cutter creaser assembly 1070 which comprises a plurality of rolls including idler roll 1072; nip rolls 1074, 1076 driven by motor 1075; and idler roll 1078. The web passes over these rolls prior to entering a cutter unit 1090 comprising an upper fixed cutter portion 1092 and a lower reciprocating cutter portion 1094 which is caused to reciprocate at a constant speed by a cutter drive motor 1096. Fixed knives 1098 mounted on the lower reciprocating cutter portion 1094 have the same configuration as the design cut 1025, 1026. Subsequent to being cut by the cutter unit 1090 the web passes over a delivery table 1110 where cut blanks 1112, in the shape of design cuts 1025, 1026, etc., formed in the cutting operation are caused to be deposited on the delivery table in stacked relationship. Operating personnel periodically remove the stacked blanks 1112, placing the blanks on pallets, etc. for subsequent transport to other machinery for further forming operations such as folding. The cutter unit 1090 and stacking table 1110 assembly may be of a conventional type well known in the art. For example, the cutter unit may be model no. Z714 manufactured by Zerand of New Berlin, Wisc. The scrap web 1114 i.e. the web with the blanks 1112 removed therefrom is cut into small pieces and removed at the stripper which is a part of the cutter between 1094 and 1114. The scrap web 1114 may be collected for disposal or recycling.

A central control problem solved by the present invention is the longitudinal phasing of a web 1020 to a cutter 1090 to ensure that the cutter cuts the web precisely at the design cuts 1025, 1026 rather than at some other longitudinal position which is longitudinally misaligned with the graphics 1023 in each repeat length 1024. The apparatus for providing longitudinal monitoring and control of the web 1020 will now be described.

As shown by FIG. 9 a series of longitudinally spaced-apart laterally extending marks W, X, Y, Z are repeated at intervals along the film web 1020 which define the repeat length 11024. The marks are positioned in a predetermined fixed relationship relative the repeating graphics 1025, 1026 on the web 1020 and are also located in generally fixed relationship between the lateral edges 1021, 1022 of the web 1020. The marks W, X, Y, Z extend laterally of the web and are generally in longitudinal alignment with respect to the web such that all of the marks will be detected by a single mark detection unit positioned at a fixed location above the web and defining a longitudinally extending mark detection path 1125. In one embodiment of the invention referred to below as the unit 1120 may be moved laterally as indicated at 123 to other discrete positions to define a plurality of other mark detection paths such as 1127. In the embodiment illustrated in FIG. 8 the photo eye assembly 1120 is positioned between the mark detection string insertion assembly 1050 and the cutter assembly 1070 at a location 1121 a predetermined known distance of web travel from the cutter unit 1090. A strobe unit 1122 is positioned in this same general area to illuminate a relatively small portion of the web which includes the area of mark detection 1121 of the photo eye assembly 1120 or may be positioned an integer number of repeat lengths away from 1121 e.g. two repeat lengths upstream or downstream. An encoder unit 1124 which puts out a predetermined number of electronic pulses per revolution of an associated roller is mounted on roller 1072 immediately downstream of photo eye assembly 1120. The roller 1072 engages the web 1020 passing thereover in non-slipping contact and thus the number of pulses from encoder 1124 during any particular time interval is linearly proportional to the distance that web 1020 has travelled during that time interval. A computer 1100 (which may include a conventional microcomputer or minicomputer with appropriate control software and electronics) receives signals from the encoder, photo eye, and drive motors 1075 and 1096. An input terminal means such as keyboard 1130 is provided to enable operator input of certain values particular to a web being run and also to manipulate the strobe 1122 as described below.

Since each of the longitudinally spaced-apart preprinted marks W, X, Y, Z are located at a fixed longitudinal position with respect to an associated design cut e.g. 1025 then the distance of that design cut relative the cutter knives 1098 may be precisely determined if the distance of any mark W, X, Y, Z from the mark detection point 1121 beneath the photo eye 1120 is known. For example if mark W is located at the leading edge 1029 of each design cut 1025, 1026, etc. and if the mark detection point 1121 is located 3 repeat lengths from the leading edge of knives 1098 (corresponding to design cut leading edge 1029) then it may be determined that the design cut 1025 is 3 repeat lengths from the cutter. If the distance of a design cut e.g. 1025 from the cutter blades 1098 at a particular point in time is known and if the line speed of the web is known then it may be precisely predicted when the design cut will be positioned opposite the cutter blades 1098. If the point in time that the cutter actually cuts coincides with the same time that the design cut 1025 is actually opposite the cutter then the web 1020 is "in phase" with the cutter. If these two events do not occur simultaneously then the web is "out of phase" with the cutter. If the web is out of phase with the cutter it may be brought back into phase with the cutter (assuming that both the cutter and the web speed are proper for the repeat length being cut) by either phasing the cutter to the web (by stopping and restarting it properly) or by phasing the web to the cutter (by speeding up or slowing down the web for a short period of time and then returning to normal line speed).

One operation performed by the control system of the present invention is the selection and recognition of a register mark within each repeat length 1024 that enables an associated computer 1100 to determine the relative position of each incoming set of repeating graphics and associated design cut with respect to the cutter 1098. A computer 100 in accordance with this determination of relative position between the incoming graphics pattern and the cutter 1090 and in accordance with the phase of the cutter controls the speed of the motor 1075 which drives nip rolls 1074, 1076 to phase the graphics on the web to the cutter. The phasing of a repeating patterns of graphics etc. on a moving web to a cutter or other device performing periodic operations on the web is described in U.S. Pat. No. 4,549,917 of James W. Jensen which is hereby incorporated by reference for all that it contains. The phasing control described in this patent, and in most other high speed (e.g. 500 fps) web production operations, rely on the sensing of a single register mark within each repeat length. Once the mark is sensed its relative position with respect to a cutter etc. is determined and used for phasing as described above. However if the register mark is located in an obstructed field of marks it is not possible to sense the register mark using prior art methods.

The process of pattern or image recognition of the embodiment of FIGS. 8–14 relies on the recognition of criteria associated with the spacing of laterally extending longitudinally spaced-apart repeating series of marks such as W, X, Y, Z. The manner in which the computer selects criteria on which to base this recognition and the manner in which subsequent to this selection process an image is recognized and continuously monitored will now be described.

Figure 10:
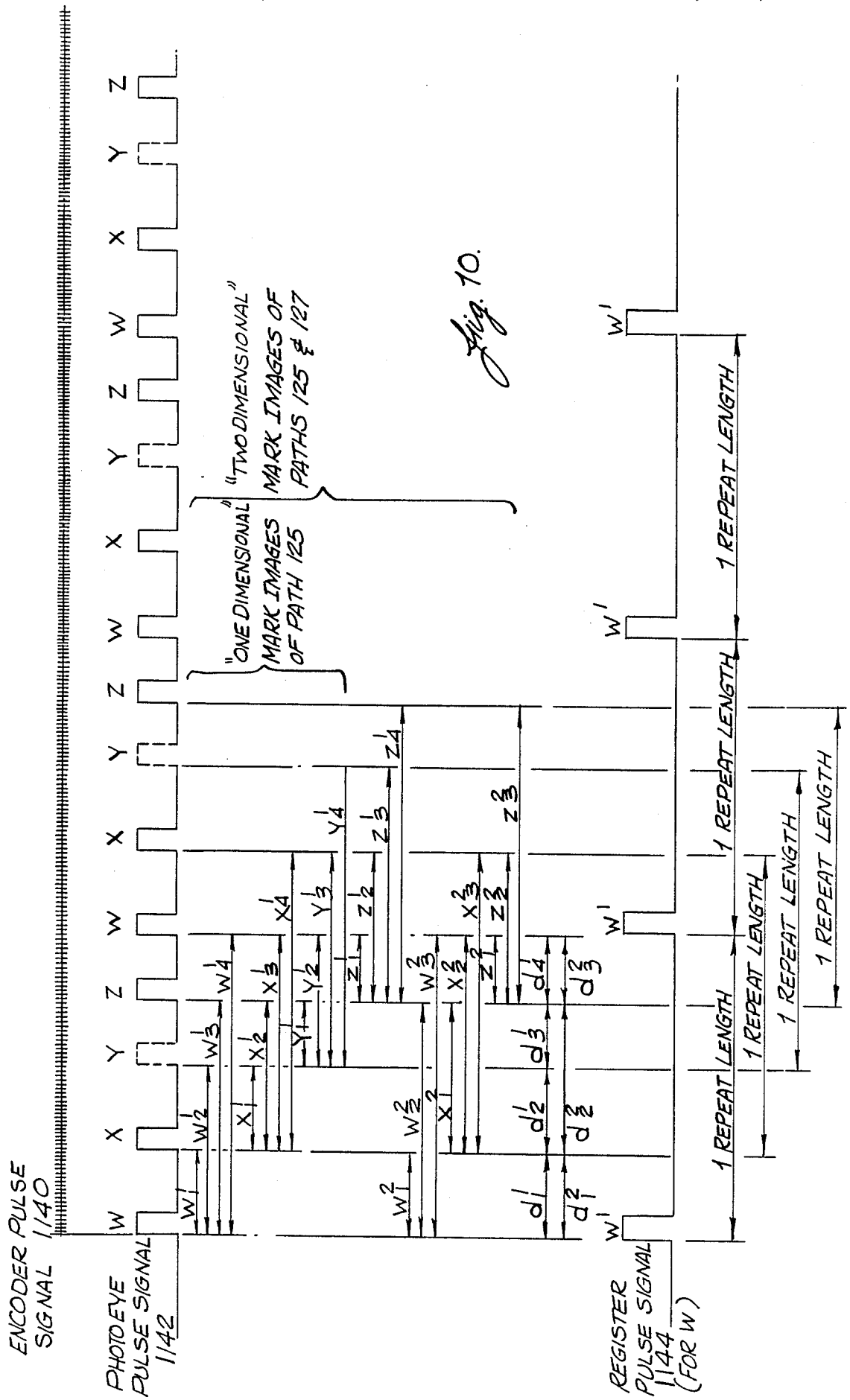
FIG. 10 is a schematic view of certain signals generated by the control system of FIG. 8.

In operation the computer is initially updated with certain information supplied by a human or by the system software data base operator. Included in this information is the repeat length of the web 1020 graphics; typically a value between 10 inches and 40 inches. Next the image recognition system is placed in a start up mode in which an encoder 1124 pulse signal 1140 and a photo eye 1120 mark detection pulses signal 1142, FIG. 10, are input to the computer 1100. The encoder 1124 may typically have a pulse frequency on the order of 500 or 1000 pulses per inch of web travel. The pulses produced by a photo eye 1120 may be square wave pulses produced by sensing light intensities above and below a preset value. In the illustrated example of FIG. 10 the upper portion of the signal indicates the presence of a dark area on the web. The computer functions described herein are typically set to be triggered by the leading edge of a dark area indicating pulse but might also be set to be triggered by the trailing edge.

In start up mode operation the computer randomly chooses a mark such as W as shown in FIG. 10. Since the computer "knows" the repeat length of the web 1020, it may compute when the mark W will be repeated by counting the number of encoder pulses in signal 1140 which occur after sensing the leading edge of mark W in pulse signal 1142. When the number of encoder pulses counted is sufficiently close to the total number of encoder pulses which would be generated in one repeat length, e.g. when the counted pulses are 97% of this total repeat length number, a register pulse generating task of the computer starts "looking" for a mark pulse from signal 1142 and generates a pulse signal e.g. $W^1$ at the occurrence of the first pulse in signal 1142 that it "sees." After generating a register pulse, e.g. $W^1$, the register pulse generating task stops "looking" for pulses in signal 1142 until it has again counted a sufficient number of encoder pulses to be close, e.g. 97%, to the end of a repeat length. At this point it again "looks" for the next pulse from signal 1142 and generates a corresponding register pulse, etc. Thus a chain of register pulses $W^1$ are generated which correspond to the passage of marks W, and only marks W, past photo eye 1120. This register pulse signal 1144 is used to control strobe 1122. The strobe is illuminated at each register pulse $W^1$ and thus illuminates mark W at the time it passes beneath photo eye 1120. Thus the human operator can see which mark the computer has chosen for a register mark. The operator may decide to use this register mark or may select a new register mark by sending a "change mark" signal to the computer. The computer upon receiving a "change mark" signal skips to the next succeeding mark, e.g. mark X, and again repeats the above described operation to generate a new register pulse signal 1144 and associated strobe coinciding with the passage of mark X. This mark skipping process may be repeated until the operator has chosen the desired mark for use in register signal 1144.

Each time a register mark is selected, either by the computer or by the human operator, the computer generates a "profile" of the register mark by which it may verify that it is indeed using the selected register mark during subsequent systems operation in the "running mode." The computer also "profiles" each of the other detected marks in the repeat length in order that it may, when operating in the running mode, "recognize" which mark it is erroneously using as the register mark if it has previously determined that the correct mark is not actually being used.

The manner in which the computer "profiles" each mark will now be described.

As shown by FIG. 10 each mark W, X, Y, Z is positioned, in any repeat length, at a fixed set of distances from all other marks in that repeat length. A set of data collected over one repeat length of the web which includes the distance values between all individual marks in the web—$d_1^1$, $d_2^1$, $d_3^1$, $d_4^1$ in FIG. 10—will be referred to as the "repeat length scan image" or simply "scan image" hereinafter. In profiling a mark, the leading edge of the mark being profiled is selected as the beginning of a repeat length distance over which the mark is profiled and the distances from the leading edge of the mark being profiled to the leading edge of each other mark in that repeat length is calculated and stored in memory. It will be appreciated that by proper manipulation of the length values between adjacent marks measured in any one repeat length, i.e. the scan image values, that all of the necessary cumulative distance values for all of the marks in that repeat length may be calculated. These stored numeric distance values which are obtained in profiling each mark will hereinafter be referred to as the "mark image" of a mark. Referring to the distance values labeled in FIG. 10 as "One Dimensional Mark Images" it may be seen that the mark images of the marks are as follows:

Mark W: $W_1^1$; $W_2^1$; $W_3^1$; $W_4^1$;
Mark X: $X_1^1$; $X_2^1$; $X_3^1$; $X_4^1$
Mark Y: $Y_1^1$; $Y_2^1$; $Y_3^1$; $Y_4^1$
Mark Z: $Z_1^1$; $Z_2^1$; $Z_3^1$; $Z_4^1$ It may be seen with reference to FIG. 9 if a web 1020 were to shift laterally with respect to the mark detection unit 1120, the mark detection pulse signal 1142 might change because the mark detection path associated with photo eye 1120 would change. For example as shown in FIG. 9 if web 1020 moved laterally such that the photo eye path changed from 1125 to 1127, then mark Y would not be detected and the pulse signal 1142 would be as shown without the phantom lines-indicating no pulse for mark Y. In such a situation the mark images taken by profiling each mark in mark detection path 1127 would be different from the profile of identical marks taken in path 125. As shown in FIG. 3X, the mark images of the marks when profiled in path 127 would be computed from scan image $d_1^2$; $d_2^2$; $d_3^2$ and are as follows:

Mark W: $W_1^2$; $W_2^2$; $W_3^2$
Mark X: $X_1^2$; $X_2^2$; $X_3^2$
Mark Y: 0; 0; 0
Mark Z: $Z_1^2$; $Z_2^2$; $Z_3^2$ In order that a mark may be "recognized" by the computer when the web is shifted slightly laterally from a centered position it may be desirable to provide several profiles of a mark which is selected as the register mark, in laterally offset detection paths. For example in addition to the mark profiles taken when photo eye 1120 is positioned in path 1125 it may be desirable to take profiles, say every 0.050 inches up to a distance spaced ½ in. laterally to each side of the control path 1125 by incrementally shifting photo eye 1120 laterally along lateral path 1123 and taking mark profiles at each incremental location. Thus, in this example, twenty one mark images would be generated and stored in memory for the register mark-one image for path 1125 and twenty images each for the paths (only 1127 shown) on either side of path 1125. The mark image of a register mark as distinguished from the other marks in a repeat length will be referred to as the "reference image." The generation and use of information from these laterally offset mark detection paths will be referred to herein generally as "two dimensional image recognition." Use of reference images from only a single path will be referred to generally as "single image recognition."

Once the profiling of marks is completed the computer 1100 is placed in a "running mode" in which it continuously monitors the passage of the mark which has been selected as the register mark. During the running mode both photo eye pulse signal 1142 and the register mark pulse signal 1144 are generated in the same manner as in the start up mode. The register pulse signal 1144 is used during the running mode to continuously inform the computer of the phase position of the web 1020 graphics 1023 and associated design cuts 1025, 1026, etc. with respect to the cutter 1090. This information is used by the computer to generate a control signal to pinch roll motor 1075 etc. to periodically adjust the speed of the web 1020 to maintain proper phasing between the web and cutter. In order for this phasing control to operate properly it is of course necessary that the computer base its calculations on the periodic passage of the correct mark. For example if the computer were performing its phasing calculations on the premise that mark W was the register mark from which pulse signal 1144 was generated and in fact the pulse signal 1144 was based on mark X, then all cuts made by the cutter 1090 would be out of phase by the distance between mark W and mark X. In other words the cutter would be producing nothing but scrap. It may also be seen that it is quite likely that the register mark pulse generating task might be caused to "skip" from the chosen reference mark to another mark if there were any substantial discontinuities in the repeating graphics portions of the web. For example, in a situation where W is the initially chosen register mark, if a web splice shifts the repeating graphics on the newly spliced portion of the web a few inches forwardly (downstream) with respect to the repeating graphics on the downstream web portion pulse 1144 generating task would most likely skip from W to X in generating register pulses because the X pulse of signal 1142 would be the next pulse "seen" by the register pulse generating task when it again starts looking for a mark about one repeat length downstream of the W mark in the spliced portion of graphics.

An image recognition software task of the computer 100 is provided to determine when a mark which is used to generate register pulse signal 1144 is incorrect. This task, upon making such a determination subsequently "recognizes" which mark is then being used to generate the register pulse signal and corrects the computer's register mark data such that it thereafter uses the new register mark in making its cutter phasing determination.

The image recognition task operates by continuously taking "scan images" of each incoming repeat length and computing a mark image for the mark in the repeat length that is actually "in sync" with the computer i.e. the mark corresponding to pulse signal 1144. After such a mark image is taken it is compared to the stored reference image of the mark which the computer assumes to be the register mark. If the mark image matches the reference image closely enough no changes are made. However in single dimension image recognition if the mark image does not match the reference image of the assumed register mark then the computer will compare the in sync mark image to the reference image of each of the other marks in the repeat length scan image. Based on these comparisons the computer chooses the mark in the repeat length whose reference image most closely matches the in sync mark image and chooses that mark as the "correct" register mark. The computer thereafter changes the data used for cutter phasing to replace the old register mark with newly chosen mark.

In "two dimensional image recognition" essentially the same procedure is used to monitor and correct the register mark choice that is used by the computer to control web phasing with the cutter. However two dimensional image recognition also takes into account that none of the mark images may match a reference image due to lateral shifting of the web. Thus a further process is added to that of single dimension image recognition after the task recognizes that the presently used reference image does not closely match any of the mark images. That additional process is to compare the in sync mark image to each of the other reference images (from laterally displaced paths) of the assumed register mark to see if there is a match. If there is, then the matching reference image of the assumed register mark replaces the old reference image of the assumed register mark and the sync pulse hardware does not reset. However, if none of the reference images of the assumed register mark match the in sync mark image, then the in sync mark image is compared with all of the different reference images (from laterally displaced paths) of all of the other marks, and if there is a match, the corresponding mark is chosen as the new register mark and the sync pulse hardware is resynchronized to the newly selected mark. If there is not a match, then the process is repeated in the next repeat length.

In comparing a mark image to the reference image the length values in the mark image are compared one at a time to all of the length values in the reference image. The number of matches (within a selected tolerance) between the mark image distance values and the reference image distance values are then counted. A determination that a mark image "matches" a reference image is based on the number of matches between the distance values of the two images as compared to the total number of possible matches. For example in a pair of images each having 20 marks in a repeat length, 15 distance component matches would probably be treated as a "match" of images. With only 4 marks in a repeat length a match of only one distance value between images might be too low for a "match" of the images. A "confidence number" may be used to make the match or no match decision based upon the confidence number being above or below a preset value. A typical "confidence number" definition might be confidence number=100−SCALE (Ref. Image Size-Match Count)-scale/2 [Mark Image Size-Ref. Image Size] where SCALE=75/Mark Image Size and where Mark Image Size and Reference Image Size each refer to the number of distance values in the image. All confidence numbers above a selected value, say 50, are considered matches and those below that value are considered non matches. The figure selected will of course vary with the resolution of the encoder, tolerance selection for distance matches etc.

As an example if a reference image contains distance values measured in encoder pulses of $W_1=500$, $W_2=1210$, $W_3=1996$ and $W_4=2211$ and the mark image being compared is 498, 1210, 2000, 2210 and 220 (five marks detected) and the tolerance in comparing distance values is 3 encoder pulses; the comparison would be made as follows:

1. $W_1=500$ is compared to 498, 1210, 2000, 2210, and 2200—this is a match because 500 is within 3 of 498, thus 1 distance match is recorded.
2. $W_2=1210$ is compared to 498, 1210, 1996, 2210, and 2211—1210 matches 1210 and thus another distance match is recorded.
3. $W_3=1996$ is compared to 498, 1210, 2000, 2210, and 2200—no distance match.
4. $W_4=2211$ is compared to 498, 1210, 2000, 2210 and 2200—a match.

Thus the total image match number is 3 out of a possible 4 for a confidence number of 78.

An advantage of using a confidence number in determining an image match as opposed to requiring a 100% match of distances in the two images is that it accounts for situations such as in the above example when a random mark, caused by say a defect on the web, appears in a scan image or when one or more marks which previously occurred fail to appear because of lateral web shifting or changing ambient light. In such situations the distance values to the other marks in the repeat length from the mark whose mark image is being taken are not caused to vary by the randomly occurring marks and thus the mark image and the reference image may properly be determined to match even though some of the mark image distances differ from the reference image distances.

Hardware Windowing Circuitry

Figure 11:
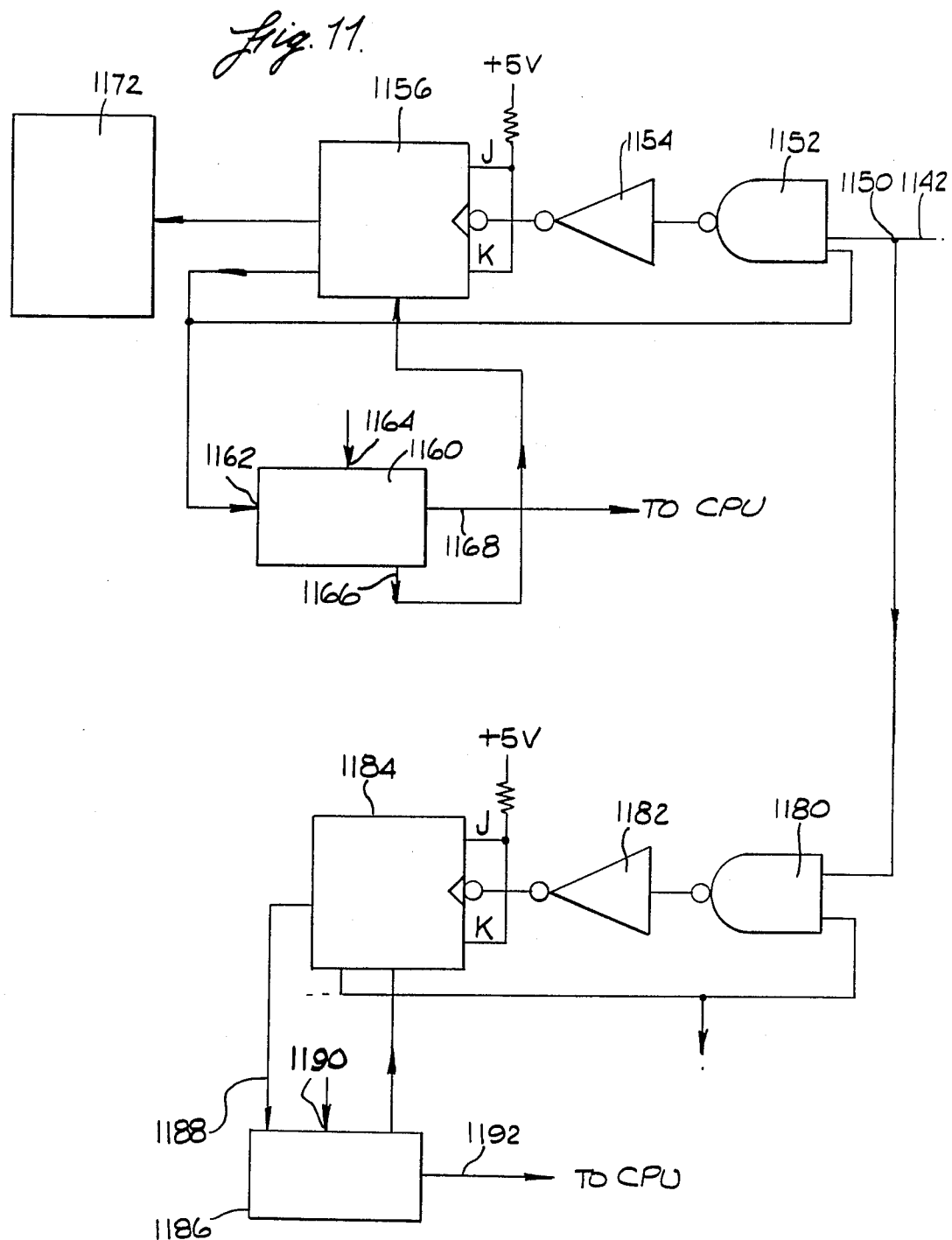
FIG. 11 is a schematic diagram of certain hardware utilized by the computer in the control system of FIG. 8.

A pulse signal 1142 which contains a pulse corresponding to each mark which is sensed by the photo eye 1120 is input to the hardware windowing circuitry as indicated at 1150, FIG. 11. This pulse is also received by hardware which will be referred to hereinafter as pulse shadow hardware. The purpose of the pulse shadow hardware is to enable an associated counter to count and code pulses and thus measure the distance between marks. In performing this function it excludes mark pulses which occur too close to a previous mark. A distance that is "too close" is operator selectable and may be on the order of ½ inch. This shadow windowing hardware comprises a NAND gate 1152; an inverter 154; and a JK flip-flop 1156. All these components are conventional off the shelf components well-known in the art. Also associated with this shadow hardware is a counter 1160 which receives a gate input at 1162 from the shadow hardware and encoder input 1164 corresponding to encoder pulse signal 1140 and which provides an output 1166 which represents the timing of the shadow pulse. It occurs the pre-set distance, e.g., ½ inch, after the gate pulse received. This pulse is output to the JK flip-flop 1156. Another output of the JK flip-flop 1156 which occurs simultaneously with gate signal 1162 to the counter is an inverted signal 1170 which is received by the computer and used as an interrupt to cause the computer to read the value of counter 1160. Thus, the pulse shadow hardware in combination with counter 1160 and the interrupt controller 1172 and the computer central processing unit is used to measure the distances between individual marks sensed by the photo eye 1120.

The other hardware which receives pulse 1150 and which operates in combination with the shadow image hardware to produce a scan image will be referred to hereinafter as in sync pulse hardware. As illustrated in FIG. 11, the in sync pulse hardware circuitry comprises a NAND gate 1180, an inverter 1182 a JK flip-flop 1184 associated with a second counter 1186. The counter 186 receives a gate pulse from the JK flip-flop at 1188, an encoder signal 1140 from the encoder at 1190 and outputs the signal 1192 to the CPU and a second signal 1194 to the JK flip-flop. The function of this hardware circuitry is to generate a measurement from one in sync mark to the next in sync mark and to identify to the computer which mark is in sync. The gate output 1188 from flip-flop 1184 may also be used to operate a strobe light for illuminating the mark which is in sync in a manner which is conventional and well-known in the art.

Software Definitions

Figure 12:
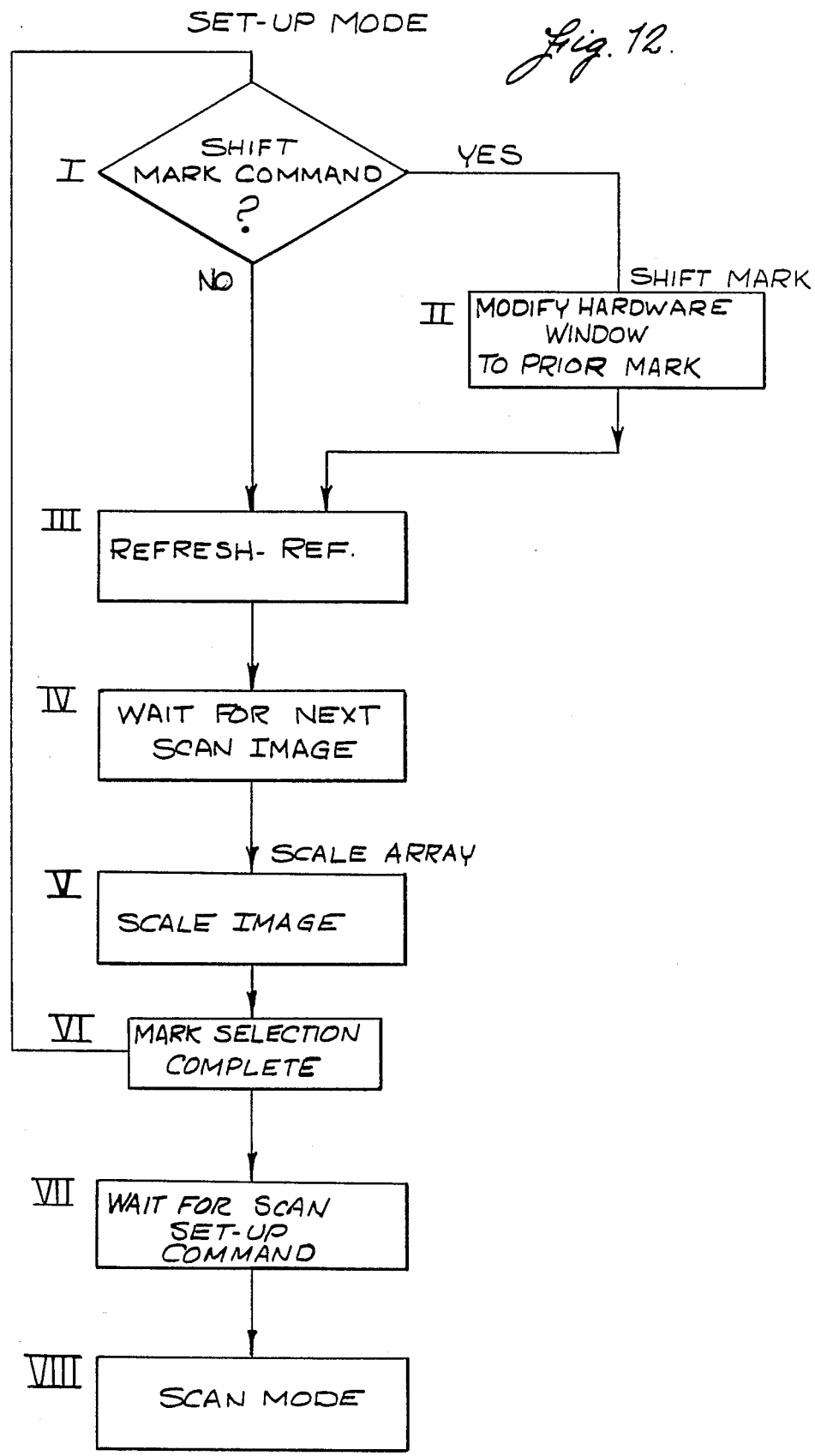
FIG. 12 is a flow chart of software decisions in the set up mode.
Figure 13B:
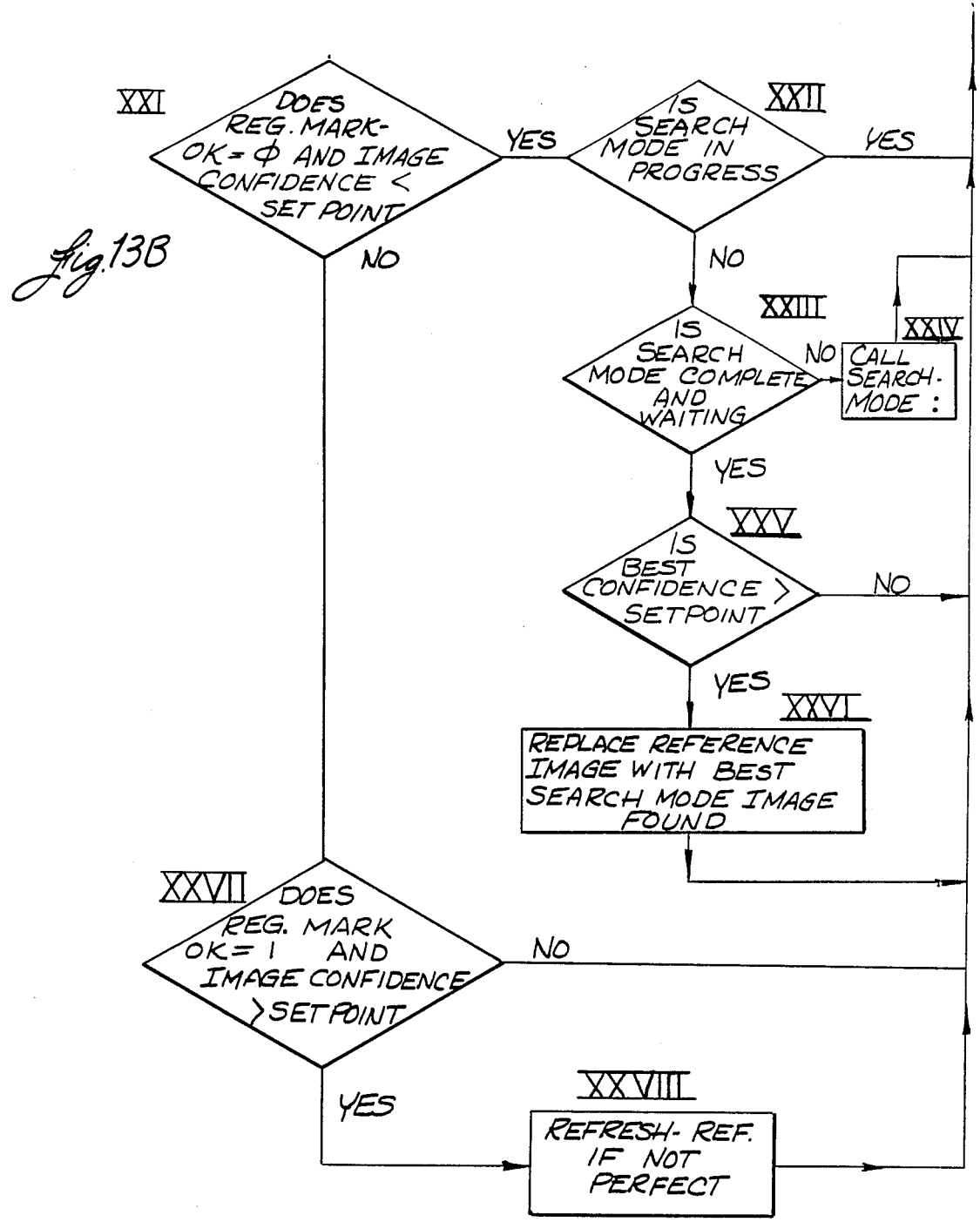
Figure 14:
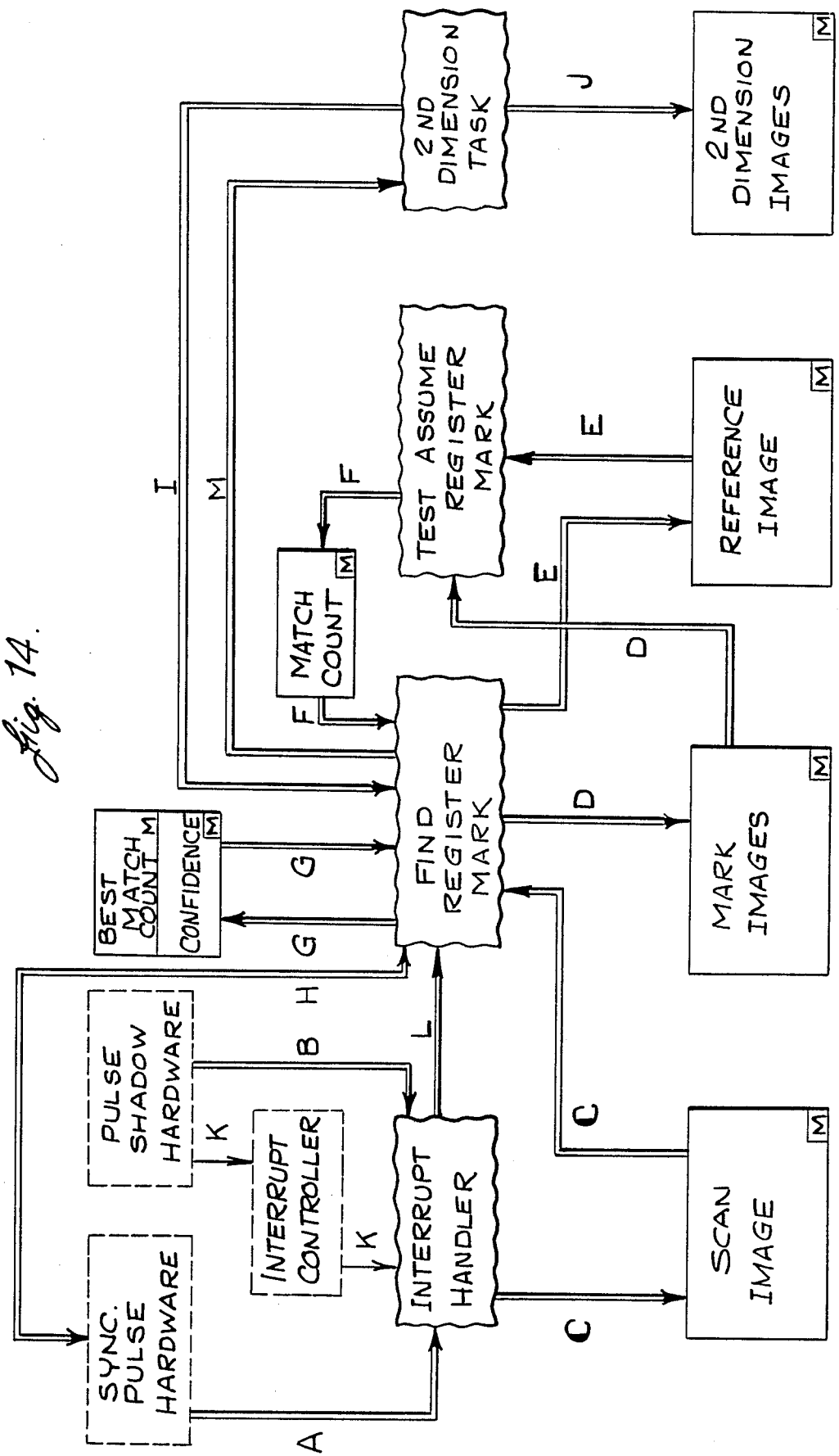
FIG. 14 is a flow diagram illustrating data flow in the control system of the present invention.

Certain software functions and data values will now be defined which will aid in understanding the flow charts of FIGS. 12–14.

One dimensional image recognition is the basic image recognition process by which computer software determines if the sync pulse hardware is in sync with the correct mark. If it is found not to be in sync, single dimension image recognition modifies the programmable counter to correct the synchronization. Single dimension image recognition will be referred to as SIDREC hereafter.

SIDREC requires certain data to be stored which must be defined to begin the explanation;

SCAN IMAGE: this is a collection of measurements of the distances between the marks in the current image. These values are measured by a second programmable counter, not the sync pulse hardware. It is an ordered list in which the first value (SCAN IMAGE[1]) is the distance from the mark which is in sync at the time and the next mark in line. The last value (SCAN IMAGE[X]), if there are X marks in the image, is the distance from the mark prior to the synced mark to the synced mark. The total of these values is one measurement of repeat length. SCAN IMAGE corresponds generally to distance measurements such as: $d_1^1$; $d_2^1$; $d_3^1$; $d_4^1$ shown in FIG. 10.

REF ACCUM LIST: this is a collection of measurements from the selected register mark to every mark in the image. It is an ordered list in which REF ACCUM LIST(1) is the distance from the selected register mark to next mark in line. REF ACCUM LIST(X), if there are X marks in the image, is the distance from the selected register mark to the next occurrence of the selected register mark or one repeat length. This is not a current image but the reference image which was selected initially at setup time by the operator and possibly refreshed later by the computer. In the example of FIG. 10, REF ACCUM LIST would include $W_1^1$, $W_2^1$, $W_3^1$, $W_4^1$; $X_1^1$, $X_2^1$, $X_3^1$, $X_4^1$, etc.

IMAGE CONFIDENCE: this is an integer which is equal to 100 if the scan image is an exact match to the reference image. Points are subtracted from this if either there are extra marks in the scan image or if some of the reference image marks are not matched by marks in the scan image. The number of points subtracted is scaled to match the image. That is, if one mark is missing from a 10 mark image confidence, is lowered only a little. If one mark is missing from a 3 mark image, confidence is destroyed. Note that confidence may be 100 even if the image is out of sync. Confidence is a measurement of the knowledge of the image and the knowledge of the location of the register mark.

REG MARK OK: this is a flag which equals 1 if the image is believed to be in sync (irregardless of confidence) and a 0 if not.

BEST MATCH COUNT: when the set of mark images for one scan image is tested against the reference image, each mark in the image is momentarily assumed to be the selected register mark. Each mark image is tested and the number of matches is counted. The highest number found is the BEST MATCH COUNT. The mark which produces the BEST MATCH COUNT is the register mark.

SIDREC requires several intermediate software functions which will now be defined:

SCALE ARRAY
FIND REG MARK
TEST ASSUME REG MARK
SHIFT MARK
RESYNC IMAGE
REFRESH REF

SCALE ARRAY: each time a scan image is taken, the values in the image are adjusted (scaled) to match those that would occur if the image were exactly the correct repeat length. This is necessary because the variation in repeat length which occurs constantly with composite would make the comparison of the reference image which may have been taken on an extra long image, with a scan image which on a particular scan may be extra short, very sloppy. A very large tolerance on individual marks would be required if two such images were to match.

FIND REG MARK: this is the main procedure of SIDREC. This procedure calls the TEST ASSUME REG MARK procedure as many times as there are marks in the image. FIND REG MARK records the BEST MATCH COUNT found. After all marks are tested, the IMAGE CONFIDENCE is calculated for the best match count only. FIND REG MARK then sets the REG MARK OK flag=1 if the best mark found is in sync or to 0 if not.

TEST ASSUME REG MARK: this procedure counts the number of matching marks between a single version of the scan image and the reference image. A mark matches if the distance from the assumed register mark to this mark matches any value in the REF ACCUM LIST. The tolerance on the match is selectable e.g. plus or minus 0.050 inches. For each scan image this routine is called as many times as there are marks in that image. It is called one time for each mark image.

FIND REG MARK also contains the following steps:

SHIFT MARK: this step is used only in setup mode to select a new register mark. It causes the sync to skip to the next mark when the identify mark button is pressed. Or if pressed multiple times, to skip that many marks.

RESYNC IMAGE: this is the automatic change of the programmable counter to recover synchronization when it is lost. Resync is controlled by the REG MARK OK flag and IMAGE CONFIDENCE. If REG MARK OK=0 and IMAGE CONFIDENCE is higher than the required amount, the sync pulse hardware window is closed until the register mark after next.

REFRESH REF: this routine is used to install the current image in the REF ACCUM LIST in two different modes. In setup mode refresh constantly copies the current image to the REF ACCUM LIST. It assumes that the image is in sync with the desired mark. In run mode a refresh occurs only if the image in in sync and the confidence is higher than the selected limit. This is done to allow SIDREC to maintain a good image even if there are small variances in the image from time to time. These are common and are caused by sidelay motion of the web and photo eye sensitivity variations.

Two Dimensional Image Recognition: the third level of image recognition is used as a backup for SIDREC in the event that IMAGE CONFIDENCE will not allow a resync. There are two major sections to consider.

SCAN MODE: this mode is requested by the operator at a point in the setup procedure. It is done after the "Setup Mode" when the operator selects the mark. SCAN MODE drives the photo eye assembly to the side a selected number of times. In each position it takes and records a reference image. The photo eye assembly returns to the center of the Reg Mark and then drives to the other side to take the other half of the possible images. The operator may select the number of images to be taken and the distance between each image. A complete set of reference images is kept for future reference by the SEARCH MODE.

SEARCH MODE: in the event that SIDREC believes the sync pulse hardware is out of sync with the correct mark but cannot resync due to low IMAGE CONFIDENCE, the search mode is called. A copy of the current image is made and then tested against the entire set of reference images. The IMAGE CONFIDENCE is measured for every reference image. The best image is returned as a recommendation to SIDREC. If the confidence is higher than a set limit and SIDREC is still in need of a new reference image, then the returned image is copied into the REF ACCUM LIST. SIDREC then goes on with a new REF ACCUM LIST (new reference image) and uses the current SCAN IMAGE (which may have changed since SEARCH MODE was called) and attempts a resync if it can.

A data flow chart which shows memory storage, software modules and the paths of data flow in computer 1100 is illustrated in FIG. 14.

A. A word (2 byte) value equal to the number of encoder pulses from 1 sync pulse to the next, it only occurs on the sync pulse and therefore indicate which of the pulse shadow marks is in sync.

B. A word (2 byte) value equal to the number of encoder pulses from 1 mark to another.

C. An array of words (as many as there are pulses in the repeat length) each is a "B" value.

D. An array of arrays of words, for a 10 mark scan image there are 10 arrays of 10 values each. Each array fits the definition of the reference ACCUM LIST. The entire data set never exists all at once but is computed as various individual values are required.

E. A single array of words which is the REF ACCUM LIST. Initially installed by FIND REG MARK in set up mode, updated by refresh and corrected through FIND REG MARK by the second dimension task.

F. Match count, a byte which is the number of in tolerance matches between a single mark image and the reference image.

G. Confidence and best match count calculated and used by FIND REG MARK.

H. Output to the hardware to resync to the register mark. A word value.

I. An array of arrays of words. Each array is a reference ACCUM LIST based on the register mark but in a different lateral position.

J. Same as I.

K. A hardware signal to activate the interrupt handler software.

L. A software signal to activate the FIND REG MARK task.

M. Software signals to command the two sections of second dimension task (scan mode and search mode).

System operation will now be further described with reference to the flow charts of FIGS. 12, 13A and 13B. In the setup mode the first decision to be made is whether the mark selected by the sync pulse hardware is the one desired by an operator. The decision to use the mark selected by the computer or to select a new mark is indicated at I. In the event a new mark is required the operator sends a signal to the computer whereby the mark selected by the computer is shifted one position as indicated at II. After the selection of no or the completion of the selection of a new mark the next operation performed is indicated at III as refresh reference which refers to the operation of computing a reference image from the current scan image and copying that information into the reference image memory location in the computer. The next step, IV, indicated as wait for next scan image, indicates that the computer waits for the next scan image to occur and then accumulates scan image data consisting of the distance values between the various marks in the scan image. V indicates that this data from the scan image is scaled to the specification for correct repeat length. This function is necessary to correct situations in which the web, especially a plastic web, may stretch or shrink from a preset specified repeat length. VI indicates that the mark selection process has been completed. This is a timed function based on shift command. If no shift command has occurred within fifteen seconds then the computer moves to the next function indicated at VII. However if a shift command is indicated or if fifteen seconds have not elapsed since the last shift command then the process followed is to return to the top of the setup mode as indicated by the decision path to the left of the mark selection and complete box. After the elapse of fifteen seconds from the last shift mark command the decision process moves to VII and waits for a scan setup command. After a scan setup command is given the process moves to VIII two dimensional scan mode wherein essentially the same process of steps I–VI is again completed for each new mark detection path which is selected by the operator and each of the reference images from the new mark detection paths are stored in a reference image library separate from the reference image storage area from one dimensional image recognition for subsequent use during two dimensional image recognition in the running mode.

The operation performed by the computer in the run mode will now be described with reference with FIGS. 13A and 13B. Initially as indicated at IX the computer waits for the next scan image and collects the data values from the scan image when it occurs. As indicated at X the data from the scan image is then scaled in the same manner as described above in the setup mode. As indicated at XI the next function performed is the selection of one mark from all of the marks in the scan image. That mark is assumed to be the register mark and as indicated at XII the mark image of the assumed register mark is tested against the current reference mark image and a match count of the matching data values of the two images is calculated. This match count is recorded if it is the best match count of any thus far tested with respect to a particular scan image as indicated at step XIII. As indicated at step XIV the computer then decides whether or not all of the marks in the scan image have been tested against the current register mark. If they have not, then the mark in the scan image is tested and this process continues until all marks have been tested. After all marks have been tested the process moves to XV. At XV the confidence number for the mark having the best match count is calculated. As indicated at XVI a decision is then made based upon whether the mark with the best match count is in synchronization with the photo eye 1120 i.e. whether that mark is the mark which corresponds to the pulse of reference signal 1144. If it does correspond then the decision path to operation XVIII is indicated where the test results are indicated to be alright and the test value flag is set to one. If the mark is now in sync then the test flag value is set to 0 as indicated at box XVII. The next decision made as indicated at XIX is whether the mark is not in sync and whether the image confidence is above a predetermined value. If both of these statements are true then the image is resynced as indicated at box XX. If either or both of these statements is incorrect then the process moves to the decision indicated at XXI. If the assumed register mark is not in sync and if the image confidence is less than the set point then the decision process moves to step XXII. If either one of these statements is not correct then the decision process moves to XXVII. As indicated at XXII the computer checks to see if the search mode is in progress. If it is then the decision process returns to step IX and waits for information from the next repeat length. If the search mode is not in progress then the next decision as indicated at XXIII is whether the search mode is completed and waiting. If it is not completed and waiting then the search mode is called as indicated at XIV and thereafter the decision process returns to step IX. If the search mode is completed and waiting then the decision process moves to decision XXV to determine whether the confidence number of the selected mark is greater than the predetermined set point. If it is not then the decision process returns to step IX. If it is then the reference image of the selected mark is used to replace the current reference image and is defined as the new reference image. Thereafter the decision process returns to step IX. Returning to step XXI, if that decision is no, then the next decision to be made as indicated at step XXVII is whether the register mark is in sync and also if the image confidence is above the predetermined set point. If both of these conditions are not met then the decision process returns to IX. If both of these conditions are met then the decision making process goes to step XXVIII indicating that if the current reference image is not perfect then new data for the mark used as the current reference image is substituted for the data presently used as the reference image for that mark. Thereafter the system again returns to step IX.

It is contemplated that the inventive concepts herein described may be variously otherwise embodied and it is intended that the appended claims be construed to include alternative embodiments of the invention except insofar as limited by the prior art.

What is claimed is:

1. Apparatus for monitoring a moving web of material of the type having a repeating series of graphics patterns thereon which repeat at ordinarily constant distance intervals of web travel for determining the relative longitudinal phasing relationship of the graphics patterns on the web with respect to a selected reference point comprising:
   (a) indicia detection means positioned at a fixed position relative the moving web for detecting the passage of separate ordinarily repeating indicia portions of the repeating graphics patterns which define a repeating indicia set and which are positioned in an indicia detection path extending longitudinally of the web and for providing an indicia detection pulse signal having pulses corresponding to each detection of an indicia by the indicia detection means;
   (b) register indicia designating means for initially designating one of the repeating indicia in the repeating indicia set as a register indicia;
   (c) register indicia sensing means for operating on said indicia detection pulse signal for providing a register indicia pulse signal having pulses which in normal operation of said sensing means corresponds to the detection of the currently designated register indicia by said indicia detection means and which in abnormal operation of said sensing means corresponds to the detection, by said detection means, of one of the repeating indicia in the repeating indicia set that is not the currently designated register indicia;
   (d) encoder means for providing a high frequency encoder pulse signal in which each pulse corresponds to a predetermined distance of web travel;
   (e) indicia profile means for counting encoder pulses occurring between indicia detection pulses for generating a set of data values defining an indicia image for a selected repeating indicia for distinguishing the selected indicia from the other repeating indicia, said data values being representative of distances between the selected indicia and other repeating indicia;
   (f) register indicia verification means for comparing indicia images for verifying that an indicia which is in synchronization with the register indicia pulse signal is the currently designated register indicia;
   (g) register indicia correction means for designating the indicia which is in synchronization with the register indicia pulse signal as the register indicia in replacement of the indicia previously designated to be the register indicia when the indicia image of the indicia which is in synchronization with said register indicia pulse signal does not match the indicia image of the previously designated register indicia.

2. The invention of claim 1 wherein said register indicia pulse signal is provided to a web speed control system for controlling the phasing of the web to downstream operating machinery such as a cutter.

3. An apparatus for monitoring the passage of certain repeating indicia on a moving web of material of the type having a repeating series of graphics patterns thereon which repeat at ordinarily constant distance repeat length intervals along the web and which contain separate repeating indicia portions which define a repeating indicia set which are positioned in a repeating indicia path extending longitudinally of the web comprising:
   (a) indicia detection means positioned at a fixed location relative said moving web for detecting the passage of each indicia in said repeating indicia path and for providing an indicia detection pulse signal having detection pulses corresponding to each detected indicia;
   (b) web travel sensing means operatively associated with said moving web for providing a web movement signal indicative of web travel distance;
   (c) indicia profiling means for processing said indicia detection pulse signal and said web movement signal for generating a set of data values for defining an indicia image for a selected repeating indicia in said repeating indicia set on a selected repeat length portion of said web;
   (d) indicia profile storage means for storing indicia profile data values associated with a first selected repeating indicia on one selected repeat length portion of the web;
   (e) indicia profile comparison means for comparing indicia profile data values associated with a second selected indicia on a second selected repeat length portion of the web with said stored indicia profile data values for determining whether said second selected indicia corresponds to said first selected repeating indicia.

4. An apparatus for monitoring the passage of certain repeating indicia on a moving web of material of the type having a repeating series of graphics patterns thereon which repeat at ordinarily constant distance repeat length intervals along the web and which contain separate repeating indicia portions which define a repeating indicia set which are positioned in a repeating indicia path extending longitudinally of the web comprising:
   (a) indicia detection means positioned at a fixed location relative said moving web for detecting the passage of each indicia in said repeating indicia path and for providing an indicia detection pulse signal having detection pulses corresponding to each detected indicia;
   (b) web travel sensing means operatively associated with said moving web for providing a web movement signal indicative of web travel distance;
   (c) indicia profiling means for processing said indicia pulse signal and said web movement signal for generating sets of data values which define a unique indicia image for each of said repeating indicia in said repeating indicia set on a selected repeat length portion of said web;
   indicia image storage means for identifying and storing the indicia image of each of said repeating indicia from a first selected repeat length portion of said web;
   (e) indicia image comparison means for comparing an indicia image associated with a selected one of said repeating indicia in a second selected repeat length portion of the web with said stored indicia images for determining which indicia on said first selected repeat length portion of the web corresponds to said selected indicia on said second repeat length portion of the web.

5. An apparatus for monitoring the phasing relationship of a moving web of material with respect to a selected fixed reference point along the web, the moving web of material being of the type having a repeating series of graphics patterns thereon which repeat at ordinarily constant distance repeat length intervals of web travel and which contain separate repeating indicia portions which define a repeating indicia set which are positioned in a repeating indicia path extending longitudinally of the web comprising:

(a) indicia detection means positioned at a fixed location relative said moving web for detecting the passage of each indicia in said repeating indicia path and for providing an indicia detection pulse signal having detection pulses corresponding to each detected indicia;

(b) web travel sensing means operatively associated with said moving web for providing a web movement signal indicative of web travel distance;

(c) indicia profiling means for processing said indicia pulse signal and said web movement signal for generating a set of data values which defines a unique indicia image for each of said repeating indicia in said repeating indicia set of a selected repeat length portion of said web;

(d) indicia image storage means for identifying and storing the indicia image of each of said repeating indicia from a first selected repeat length portion of said web;

(e) register indicia designation means for initially designating one of said repeating indicia in said repeating indicia set to be register indicia;

(f) register indicia sensing means for operating on said indicia detection pulse signal for providing a register indicia pulse signal having pulses which in normal operation of said sensing means corresponds to the detection of the said selected register indicia by said indicia detection means and which in abnormal operation of said sensing means corresponds to the detection, by said detection means, of one of the repeating indicia in the repeating indicia set that is not the selected register mark;

(g) register indicia verification means for comparing a current indicia image of an indicia which is in synchronization with the register indicia pulse signal with the stored indicia image of the indicia which is currently designated as the register indicia for verifying that the repeating indicia which is in synchronization with said register indicia pulse signal is the currently designated register indicia;

(h) register indicia correction means for comparing a current indicia image of a repeating indicia which is currently in synchronization with said register indicia pulse signal with said stored indicia images for determining which of said repeating indicia is currently in synchronization with said register indicia pulse signal and for designating that indicia as the register indicia and replacing the previously designated register indicia therewith when the indicia image of the current register indicia is not verified to be the indicia which is in synchronization with the register indicia pulse signal.

6. The invention of claim 5 wherein said register indicia pulse signal and data relating to the relative position of the currently designated register indicia within each repeat length portion of the web is provided to a web speed control system for controlling the phasing of the web to a selected phasing reference.

7. The invention of claim 5 wherein said indicia detection means comprises a photoelectric scanner.

8. The invention of claim 5 wherein said web travel sensing means comprises an electronic encoder means for producing an encoder pulse signal in which each pulse is representative of a predetermined fixed distance of web travel.

9. The invention of claim 5 wherein said indicia image generated by said indicia profiling means comprise the distances from an indicia associated with an indicia image to each of the other indicia within the indicia detection path in a selected repeat length portion of the web.

10. The invention of claim 5 wherein said indicia image storage means comprises computer electronic storage means.

11. The invention of claim 5 wherein said indicia detection means is selectively incrementally laterally movable with respect to the web during a set up mode of operation for facilitating generation of indicia profiles in a plurality of longitudinally extending alternate indicia detection paths incrementally laterally offset from said indicia detection path;

and wherein indicia profiles are generated from repeat length portions of the web detected in said alternate indicia detection paths and are also stored in said indicia profile storage means;

and wherein said register indicia verification means compares said current indicia image of the indicia in synchronization with said register indicia pulse signal with said stored indicia images associated with said designated register indicia generated in said alternate indicia detection paths subsequent to comparison with said stored image associated with said designated register indicia generated in said indicia detection path whereby slight lateral shifting of the moving web is accounted for by said verification means.

12. The invention of claim 5 said register indicia sensing means comprising indicia detection signal and web movement signal processing means for measuring the distance of web travel occurring after a register indicia pulse and comparing said measured distance to a predetermined trigger distance value slightly smaller than the length of a repeat length portion of the web and for generating a register indicia pulse upon the sensing of the first detection signal pulse occurring after said measured distance exceeds said predetermined trigger distance.

13. The invention of claim 12 wherein said predetermined trigger distance is 97% of said repeat length distance.

14. The invention of claim 5 wherein said register indicia verification means and said register indicia correction means each comprise:

data value comparison means for comparing each of the data values of a first mark image with each of the data values of a second mark image;

data value match counting means for counting the number of data value matches occurring in the comparison of said first indicia image data values to said second indicia image data values.

15. The invention of claim 14 wherein said register indicia verification means further comprises:

image correspondence decision means for determining whether said first image corresponds to said second image based upon a comparison of the total actual data value matches to the total potential data value matches.

16. The invention of claim 5 wherein said register indicia designation means comprises computer actuated random selection means for randomly selecting one of said repeating indicia to be the register indicia.

17. The invention of claim 16 further comprising human operable designation means for enabling an operator to overridingly designate indicia other than the indicia randomly designated by the computer to be the register indicia.

18. The invention of claim 16 further comprising display means for visually displaying the repeating indicia which is in synchronization with the register indicia pulse signal.

19. The invention of claim 18 wherein said display means comprises a strobe light.

20. The invention of claim 19 wherein said strobe light is actuated by said register indicia pulse signal.

21. A method for monitoring the phasing relationship of a moving web of material to a selected fixed reference point along the web, the moving web of material being of the type having a repeating series of graphics patterns thereon which repeat at ordinarily constant distance repeat length intervals along the web and which contain separate repeating indicia portions which define a repeating indicia set which are positioned in a repeating indicia path extending longitudinally of the web comprising:

(a) at a fixed location relative the moving web in alignment with the repeating indicia path, detecting the passage of each indicia in the repeating indicia path and generating an indicia detection pulse signal having indicia detection pulses corresponding to the detection of said indicia;

(b) continuously monitoring the movement of the web and generating a web movement signal indicative of web movement;

(c) generating a scan image of a first selected repeat length portion of the web by processing said detection pulse signal and said web movement signal, the scan image comprising a set of data values representative of the distances between detected indicia on the selected repeat length portion of the web;

(d) from the scan image of the first selected repeat length portion of the web, generating an indicia image for each detected indicia on the first selected repeat length portion of the web, and indicia image comprising a set of data values representative of the individual distances of other detected indicia from the indicia associated with the mark image;

(e) selecting one of the repeating indicia in the repeating indicia set to be the designated register indicia;

(f) generating a register indicia pulse signal which normally has register indicia pulses corresponding to the passage of the designated register indicia past the indicia detection means and which abnormally has detection pulses corresponding to the passage of a repeating indicia other than the designated register indicia past the indicia detection means;

(g) verifying that a repeating indicia which is in synchronization with the register indicia pulse signal is in fact the indicia designated to be the register indicia by generating a scan image of a second selected repeat length portion of the web and generating an indicia image of the indicia in the second selected repeat length portion of the web which is in synchronization with the register indicia pulse and comparing that indicia image to the indicia image from the first selected repeat length portion of the web which is associated with the designated register indicia.

22. The method of claim 21 comprising the further step of:

when it is determined that a repeating indicia which is in synchronization with the register indicia pulse signal is not the designated register indicia, identifying which indicia is in synchronization with the register indicia pulse signal by comparing a current indicia image of the indicia in synchronization with the register indicia pulse signal to each of the indicia images generated from said first selected repeat length portion of the web; and selecting the indicia thus identified as the designated register indicia in replacement of the previously designated register indicia.

* * * * *